US012720130B2

(12) United States Patent
Phillips et al.

(10) Patent No.: US 12,720,130 B2
(45) Date of Patent: Aug. 25, 2026

(54) ATTENTION BASED AUDIO EXPERIENCE IN STREAMING OF LIVE EVENTS

(71) Applicant: Adeia Guides Inc., San Jose, CA (US)

(72) Inventors: Christopher Phillips, Hartwell, GA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/901,387

(22) Filed: Sep. 30, 2024

(65) Prior Publication Data

US 2026/0095604 A1 Apr. 2, 2026

(51) Int. Cl.

| | |
|---|---|
| ***H04N 21/2368*** | (2011.01) |
| ***H04N 21/233*** | (2011.01) |
| ***H04N 21/238*** | (2011.01) |
| ***H04N 21/2389*** | (2011.01) |
| ***H04N 21/81*** | (2011.01) |

(52) U.S. Cl.

CPC ....... *H04N 21/2368* (2013.01); *H04N 21/233* (2013.01); *H04N 21/23805* (2013.01); *H04N 21/2389* (2013.01); *H04N 21/8126* (2013.01)

(58) Field of Classification Search

CPC ............. H04N 21/233; H04N 21/2368; H04N 21/23805; H04N 21/2389; H04N 21/8126

See application file for complete search history.

(56) References Cited

U.S. PATENT DOCUMENTS 5,327,176 A 7/1994 Forler et al.
6,182,287 B1 * 1/2001 Schneidewend .................. H04N 21/43615 715/717
6,239,794 B1 * 5/2001 Yuen .................. H04N 7/0887 348/565
6,564,378 B1 * 5/2003 Satterfield ........ H04N 21/42206 725/39

(Continued)

FOREIGN PATENT DOCUMENTS

EP 0614315 A2 9/1994

OTHER PUBLICATIONS

"MPEG transport stream", Wikipedia, Sep. 2022, 10 pages, Online Available at: https://en.wikipedia.org/wiki/MPEG_transport_stream.

(Continued)

*Primary Examiner* — Michael B. Pierorazio
(74) *Attorney, Agent, or Firm* — HG LAW LLP

(57) ABSTRACT

Systems and methods for synchronizing a portion of the radio broadcast with a portion of a TV broadcast and switching from TV to radio broadcast upon detecting a triggering condition are described. A determination is made if radio and TV broadcasters are within a local transmission range (e.g., connected via a wire), to broadcast live event feeds directly to each other. If broadcasters are within local transmission range, then the radio broadcast's feed may be multiplexed with the audio feed of the TV broadcast. If they (Continued)

are farther apart, then their clocks may be synchronized, and the corresponding audio packets of the radio and TV broadcasts may be multiplexed together based on a time stamp from the synchronized clocks and delivered to the client device. Upon detecting the triggering condition, the client device may switch from the TV broadcast to the synchronized radio broadcast.

20 Claims, 20 Drawing Sheets

(56) References Cited

U.S. PATENT DOCUMENTS

| | | | | | |
|---|---|---|---|---|---|
| 6,742,184 | B1 * | 5/2004 | Finseth | H04N 21/47 | 725/52 |
| 6,904,408 | B1 * | 6/2005 | McCarthy | A61B 5/6815 | 705/2 |
| 6,978,472 | B1 * | 12/2005 | Nashida | H04N 21/42204 | 348/E5.103 |
| 7,100,123 | B1 * | 8/2006 | Todd | G06F 16/30 | 715/272 |
| 7,552,458 | B1 * | 6/2009 | Finseth | H04N 7/162 | 725/34 |
| 7,797,635 | B1 * | 9/2010 | Denise | G06F 16/9038 | 707/711 |
| 8,122,479 | B2 * | 2/2012 | Britt | H04N 7/17318 | 725/95 |
| 8,832,768 | B1 * | 9/2014 | Inzerillo | H04L 65/611 | 725/151 |
| 11,665,392 | B2 | 5/2023 | Chandrashekar et al. | | |
| 2002/0035727 | A1 * | 3/2002 | Numata | H04N 21/4667 | 725/44 |
| 2002/0083451 | A1 * | 6/2002 | Gill | H04N 21/454 | 348/E7.063 |
| 2003/0052911 | A1 * | 3/2003 | Cohen-solal | H04L 65/752 | 715/738 |
| 2005/0235319 | A1 * | 10/2005 | Carpenter | H04N 21/4828 | 348/E5.103 |
| 2006/0022955 | A1 * | 2/2006 | Kennedy | G06F 3/0414 | 345/173 |
| 2006/0103751 | A1 * | 5/2006 | Lee | H04N 23/632 | 348/333.02 |
| 2006/0274214 | A1 * | 12/2006 | Carro | H04N 21/4305 | 348/722 |
| 2006/0277481 | A1 * | 12/2006 | Forstall | G06F 16/957 | 715/764 |
| 2007/0101297 | A1 * | 5/2007 | Forstall | G06F 3/0482 | 715/835 |
| 2007/0118813 | A1 * | 5/2007 | Forstall | G06F 3/0488 | 715/762 |
| 2007/0157220 | A1 * | 7/2007 | Cordray | H04H 60/65 | 386/E5.07 |
| 2007/0157247 | A1 * | 7/2007 | Cordray | G06Q 30/02 | 348/E5.006 |
| 2007/0157248 | A1 * | 7/2007 | Ellis | H04N 21/25891 | 725/47 |
| 2007/0244894 | A1 * | 10/2007 | St. Jacques | H04L 67/108 | 707/999.009 |
| 2007/0271580 | A1 * | 11/2007 | Tischer | H04H 60/07 | 725/35 |
| 2008/0022310 | A1 * | 1/2008 | Poling | H04N 21/4532 | 348/E7.071 |
| 2008/0163119 | A1 * | 7/2008 | Kim | G11B 27/105 | 345/173 |
| 2008/0276280 | A1 * | 11/2008 | Nashida | H04N 21/44008 | 348/E5.112 |
| 2009/0070820 | A1 * | 3/2009 | Li | H04N 1/00167 | 375/E7.076 |
| 2009/0083824 | A1 * | 3/2009 | McCarthy | H04N 21/47 | 725/151 |
| 2009/0113472 | A1 * | 4/2009 | Sheth | G06F 16/958 | 725/110 |
| 2009/0133051 | A1 * | 5/2009 | Hildreth | H04N 21/42204 | 725/28 |
| 2009/0217332 | A1 * | 8/2009 | Hindle | H04N 21/25808 | 386/326 |
| 2009/0260034 | A1 * | 10/2009 | Friedlander | H04N 21/42204 | 725/44 |
| 2009/0290519 | A1 * | 11/2009 | Griffin, Jr. | H04B 1/3816 | 455/150.1 |
| 2010/0153885 | A1 * | 6/2010 | Yates | G06F 16/7867 | 707/723 |
| 2010/0186025 | A1 * | 7/2010 | Thomas | H04N 21/482 | 725/96 |
| 2010/0262931 | A1 * | 10/2010 | Woods | G06T 15/20 | 715/764 |
| 2010/0269134 | A1 * | 10/2010 | Storan | G06Q 30/02 | 725/34 |
| 2011/0010699 | A1 * | 1/2011 | Cooper | H04W 12/069 | 717/169 |
| 2011/0069940 | A1 * | 3/2011 | Shimy | H04N 21/42201 | 386/296 |
| 2011/0072147 | A1 * | 3/2011 | Kirksey | H04N 21/43072 | 709/231 |
| 2011/0078741 | A1 * | 3/2011 | Elshocht | H04N 21/47 | 725/50 |
| 2011/0247036 | A1 * | 10/2011 | Adimatyam | H04N 21/4755 | 725/87 |
| 2011/0271304 | A1 * | 11/2011 | Loretan | H04N 21/4438 | 725/41 |
| 2012/0019400 | A1 * | 1/2012 | Patel | H04N 21/42204 | 398/107 |
| 2012/0139945 | A1 * | 6/2012 | Choi | H04N 21/4722 | 345/660 |
| 2012/0266188 | A1 * | 10/2012 | Ryu | H04N 21/42204 | 725/38 |
| 2012/0278831 | A1 * | 11/2012 | van Coppenolle | H04L 65/612 | 725/25 |
| 2013/0205312 | A1 * | 8/2013 | Huang | H04N 5/50 | 725/11 |
| 2014/0123191 | A1 * | 5/2014 | Hahn | H04N 21/482 | 725/43 |
| 2015/0195619 | A1 * | 7/2015 | Choi | H04N 21/478 | 725/40 |
| 2017/0070773 | A1 | 3/2017 | Phillips et al. | | |
| 2017/0366852 | A1 * | 12/2017 | Choi | H04N 21/4316 | |
| 2018/0212882 | A1 | 7/2018 | Phillips et al. | | |
| 2018/0376210 | A1 * | 12/2018 | Choi | H04N 21/478 | |
| 2020/0059695 | A1 * | 2/2020 | Choi | H04N 21/482 | |
| 2024/0414018 | A1 | 12/2024 | Phillips et al. | | |

OTHER PUBLICATIONS

Costa, B. "Super Bowl Latency: 'Unfortunately, Nothing Has Changed,'says Phenix in Annual Study", Super Video Group, Feb. 12, 2024, 3 pages.

Regan, H. "Don't Touch That Dial: ComparingStreaming Radio Latency", Wowza, Jun. 6, 2017, 6 pages.

U.S. Appl. No. 18/758,822, filed Jun. 28, 2024. Title: Optimizing Content Item Compression for Adaptive Bitrate Streaming of User Generated Content (Not provided; USPTO in possession of specification, claims, and prosecution history).

U.S. Appl. No. 18/758,831, filed Jun. 28, 2024. Title: Optimizing Content Item Compression for Adaptive Bitrate Streaming by Internet Protocol Television (IPTV) Providers (Not provided; USPTO in possession of specification, claims, and prosecution history).

U.S. Appl. No. 18/758,844, filed Jun. 28, 2024. Title: Optimizing Content Item Compression for Adaptive Bitrate Streaming by Over-The-Top (OTT) Providers (Not provided; USPTO in possession of specification, claims, and prosecution history)U.S. Application.

U.S. Appl. No. 18/990,312, filed Dec. 20, 2024. Title: Enhancing Video Content With Attention-Based Complementary Virtual Sound Objects (Not provided; USPTO in possession of specification, claims, and prosecution history).

(56) References Cited

OTHER PUBLICATIONS

MLB.com, “How to access alternative audio during live game on web” (https://support.mlb.com/s/article/How-to-access-alternative-audio-during-live-game-on-web?language=en_US#:~:text=1.,feed%20available%20for%20the%20game.), (1 page), (Downloaded Feb. 24, 2026).

* cited by examiner

```
<Period start="PT346530.250S" id="178443" duration="PT61.561S">
          <EventStream timescale="90000" s
            <Event  duration="5310000">
              <scte35:SpliceInfoSection protocolVersion="0" ptsAdjustment="183003"
tier="4095">
                <scte35:TimeSignal>
                  <scte35:SpliceTime ptsTime="3442857000"/>
                </scte35:TimeSignal>
                <scte35:SegmentationDescriptor segmentationEventId="1414668"
segmentationEventCancelIndicator="false" segmentationDuration="8100000">
                  <scte35:DeliveryRestrictions webDeliveryAllowedFlag="false"
noRegionalBlackoutFlag="false" archiveAllowedFlag="false" deviceRestrictions="3"/>
                  <scte35:SegmentationUpid segmentationUpidType="12"
segmentationUpidLength="2" segmentationTypeId="52" segmentNum="0"
segmentsExpected="0">0100</scte35:SegmentationUpid>
                </scte35:SegmentationDescriptor>
              </scte35:SpliceInfoSection>
            </Event>
          </EventStream>
          <AdaptationSet mimeType="video/mp4" segmentAlignment="true"
subsegmentAlignment="true" startWithSAP="1" subsegmentStartsWithSAP="1"
bitstreamSwitching="true">
         <Representation id="1" width="960" height="540" frameRate="30000/1001"
bandwidth="1000000" codecs="avc1.4D401F">
              <SegmentTemplate timescale="30000"
media="index_video_1_0_$Number$.mp4?m=1528475245"
```

```
initialization="index_video_1_0_init.mp4?m=1528475245" startNumber="178444"
presentationTimeOffset="10395907501">
                <SegmentTimeline>
                  <S t="10395907501" d="60060" r="29"/>
                  <S t="10397709301" d="45045"/>
                </SegmentTimeline>
              </SegmentTemplate>
            </Representation>
          </AdaptationSet>
          <AdaptationSet mimeType="audio/mp4" segmentAlignment="0" lang="eng"
audioCommentary=”false”>
            <Representation id="2" bandwidth="96964" audioSamplingRate="48000"
codecs="mp4a.40.2">
              <SegmentTemplate timescale="48000"
media="index_audio_2_0_$Number$.mp4?m=1528475245"
initialization="index_audio_2_0_init.mp4?m=1528475245" startNumber="178444"
presentationTimeOffset="16633452001">
                <SegmentTimeline>
                  <S t="16633452289" d="96256" r="3"/>
                  <S t="16633837313" d="95232"/>
                  <S t="16633932545" d="96256" r="4"/>
                  <S t="16634413825" d="95232"/>
                  <S t="16634509057" d="96256" r="5"/>
                   <S t="16635086593" d="95232"/>
                  <S t="16635181825" d="96256" r="4"/>
                  <S t="16635663105" d="95232"/>
                  <S t="16635758337" d="96256" r="5"/>
                  <S t="16636335873" d="71680"/>
```

```
            </SegmentTimeline>
         </SegmentTemplate>
      </Representation>
    </AdaptationSet>
    <AdaptationSet mimeType="audio/mp4" segmentAlignment="0" lang="eng"
audioCommentary="true">
      <Representation id="2" bandwidth="96964" audioSamplingRate="48000"
codecs="mp4a.40.2">
         <SegmentTemplate timescale="48000"
media="index_radio_audio_2_0_$Number$.mp4?m=1528475245"
initialization="index_radio_audio_2_0_init.mp4?m=1528475245" startNumber="178444"
presentationTimeOffset="16633452001">
           <SegmentTimeline>
             <S t="16633452289" d="96256" r="3"/>
             <S t="16633837313" d="95232"/>
             <S t="16633932545" d="96256" r="4"/>
             <S t="16634413825" d="95232"/>
             <S t="16634509057" d="96256" r="5"/>
             <S t="16635086593" d="95232"/>
             <S t="16635181825" d="96256" r="4"/>
             <S t="16635663105" d="95232"/>
             <S t="16635758337" d="96256" r="5"/>
             <S t="16636335873" d="71680"/>
           </SegmentTimeline>
         </SegmentTemplate>
      </Representation>
    </AdaptationSet>
  </Period>
```

FIG. 18C

ATTENTION BASED AUDIO EXPERIENCE IN STREAMING OF LIVE EVENTS

FIELD OF DISCLOSURE

Embodiments of the present disclosure relate to synchronizing a radio broadcast with a television broadcast, multiplexing the audio streams of the radio and television broadcast to generate a single synchronized content stream, and automatically switching from the television broadcast to the radio broadcast in response to a triggering event.

BACKGROUND

Many popular sports, such as NFL, NBA, cricket, soccer, tennis, and baseball, are broadcast on both television and radio. In some cases, both the radio and television broadcasters are located at the game itself, providing commentary from the sidelines.

However, in other instances, the broadcasters may be situated elsewhere while still broadcasting the game. For example, during an NBA game, the television network TNT, featuring commentators like Charles Barkley and Shaquille O'Neal, might be broadcasting from their headquarters in Atlanta while the game is taking place at the Warriors'home stadium in San Francisco.

Since a live event, such as a game, may be broadcasted both via radio and television, some individuals may prefer to listen to radio broadcasts over a television broadcast. This may be due to many reasons. For example, the individuals may prefer the radio broadcast since it has much more commentary and is lot more descriptive and in-depth that the television broadcast. Since the television broadcast relies more heavily on the visual aspect and may not need to explain every detail as the user can themselves see if on the TV and form their own judgement, a radio broadcast may be lot more descriptive and in depth because it lacks the visual aspect. Certain people may also prefer radio broadcast since some teams have their own radio broadcasters who are particularly beloved by fans, leading them to choose radio over TV. In some cases, certain people may also prefer watching TV while listening to the radio broadcast of the same game being shown on TV.

Although radio broadcast may be preferred or may be heard when not in front of a TV, one drawback of the listening to the radio broadcast while watching TV is that they are not synchronized. For example, the radio broadcast may be discussing a second play that is occurring in real life at a live game while the television broadcast that lags behind may still be showing a first play.

The delay in synchronization between radio and TV broadcasts may be due to the different transmission methods. The delay in TV broadcasts may also be due to amount of processing and transcoding between the live event camera and the consumer watching on an OTT, IPTV, OTA, Cable TV, or Satellite system. Since a TV broadcast goes through a number of hops before it reaches the end consumer, every hop starting from the live event to broadcaster headend to service provider/affiliate to consumer device involves some level of processing/transcoding and as such add some level of delay at every hop which is then compounded. Unlike TV broadcasts, radio signals travel at the speed of light, with lesser obstacles due to signals involving transmission of sound waves, and as such are able to reach the listeners almost instantly or with very little delay. As such, when a broadcaster sitting at the game announces a play, it is highly likely than the play is actually occurring at the same time as the announcement, i.e., with unnoticeable lag. However, TV broadcasts may have a longer delay since they involve a more involved process that includes capturing, processing, and transmitting video and audio signals. Factors like satellite transmission, cable networks, and local broadcast infrastructure can also be the reason for the delay. As such, while you may hear the play announced on the radio, the visual representation of the play on TV might be slightly delayed. This may be even more noticeable if the individual is at the live event, and they are watching the game on a TV as well as live in real-time, i.e., the individual may notice the TV broadcast lagging behind the real game they can see in front of their eyes.

Not having a synchronized broadcasts results in disjointed commentary with visuals on TV takes away from the experience. In some cases, the radio broadcast is a minute ahead of the TV broadcast which makes a big different when it comes to sports. As such, there is a need for systems and methods that provide a more enhanced experience in which the radio and TV broadcasts are synchronized.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIGS. 18A-C is an example of an adaptation set, in accordance with some embodiments of the disclosure.

DETAILED DESCRIPTION

Figure 1:
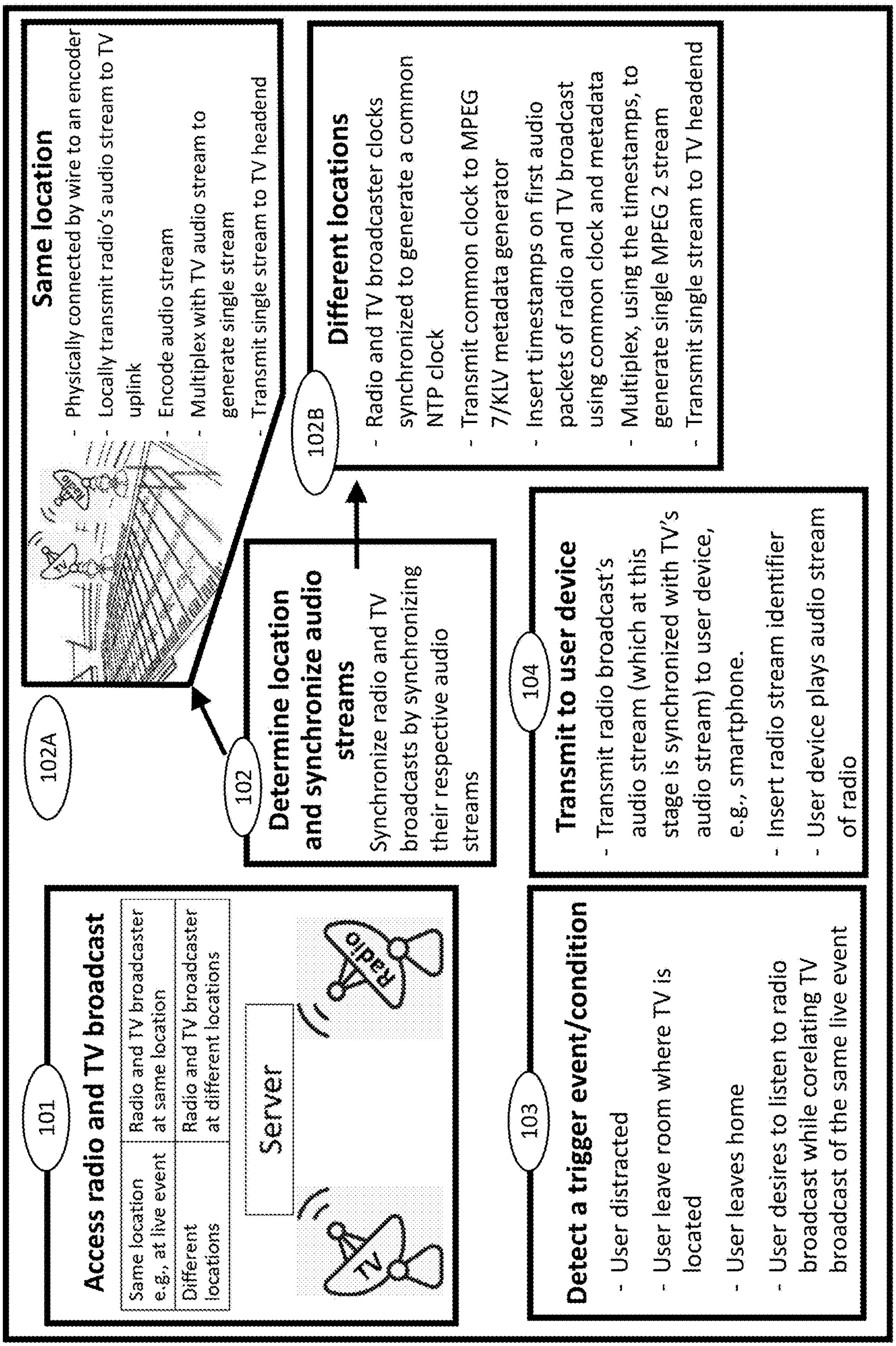
FIG. 1 is a block diagram of process for synchronizing radio broadcast with TV broadcast and switching from radio to TV broadcast upon detecting a trigger, in accordance with some embodiments of the disclosure.

In accordance with some embodiments disclosed herein, some of the above-mentioned limitations are overcome by accessing a radio broadcast and a television (TV) broadcast of a live event, synchronizing an audio stream, or a portion of the audio stream, associated with the radio broadcast with an audio stream of the TV broadcast, or a portion of the audio stream, multiplexing the synchronized audio stream associated with the radio broadcast and the video and audio stream of the TV broadcast as a single multiplexed stream with a single video, detecting whether a user consuming the TV broadcast is distracted or has left the space where the user was consuming the TV broadcast (or simply wants to consume the radio broadcast), and in response to detecting that the user is either distracted or has left the space where the TV broadcast is displayed (or simply wants to consume the radio broadcast), transmitting the single multiplexed stream, which includes the audio of the radio broadcast, to a client device, such a smartphone of the user, such that the user can enjoy the radio broadcast and be synchronized with the corresponding video being broadcasted on the TV. Although a single radio broadcast or an audio stream is described herein, the embodiments are not so limited and multiple radio broadcasts and other audio streams may also be synchronized and multiplexed with streams related to the TV broadcast. In such embodiment, the user or the system may select from the multiple radio and audio streams when switching from TV broadcast to radio broadcast. For example, the user may set criteria of which radio broadcast to select, including what stage of the live event, and accordingly the system may switch even between different radio broadcasts based on the user criteria. For example, in a live soccer game, the user may prefer to listen to a radio broadcast from a particular sports radio but when a goal is made, the user may prefer listening to a radio broadcast that is in Spanish or from a Latin American broadcaster since the broadcasters typically get very excited and loud in announcing the goal as opposed to the U.S. based broadcasters. Although references are made to an audio stream associated with a radio broadcast and an audio and video streams associated with the TV broadcast, in some embodiments, the streams referred to may be a portion of the stream and not the entire stream.

In some embodiments, the live event may be a game, such as a basketball, soccer, football, tennis, rugby, baseball, cricket, golf, ice or field hockey, volleyball, etc. The live event may also be a parade, such as the new year's parade in New York City, thanksgiving parade, Superbowl or NBA winner's parade, Independence Day parade, etc. It may also be any other type of live event or gathering, such as a political rally, for which a radio and a TV broadcast is provided.

In some embodiments, since a radio audio broadcast has much more information than a TV broadcast, such as play-by-play commentary for a game, certain people may prefer listening to a radio broadcast over a TV broadcast, which is more visual and less descriptive than the radio broadcast.

In other embodiments, if a user who was originally consuming a TV broadcast, such as watching a game, leaves the room where the TV was located, or is distracted and looking elsewhere besides the TV, or is simply not interested in the commentary provided by the TV broadcaster, then a switch may be made to the radio broadcast audio stream for such a user.

One of the goals while switching from the TV to radio broadcast is to synchronize the audio from the radio to the audio of the TV broadcast (since the audio and video of the TV broadcast are already synced together). In other words, whatever is being stated in the radio broadcast audio stream (e.g., a portion of the audio stream) should correlate with what the video is displaying via the TV broadcast. For example, if the radio broadcast is describing a play being conducted in a game, such as Tom Brady in football game throwing the ball to a receiver who is 5 yards in front of him, it should be correlated in real-time to the video displayed on the TV showing that Tom Brady is throwing the ball to a receiver who is 5 yards in front of him and not another play before or after the play being described on the radio. Put simply, if the radio broadcast audio was played while watching the TV, it should logically correlate in-real time to what is being shown on the TV display (although the commentary for both may be different).

Synchronizing radio broadcast with TV broadcast is a challenge that current technologies have not attempted and/or not been able to solve. In some instances, the TV broadcast can be as much as one minute behind the radio broadcast which further extrapolates the synchronization challenge. To overcome the technical issues faced, in some embodiments, synchronizing the audio feed from the radio to the video feed from the TV may be accomplished by a plurality of embodiments described herein. In a first embodiment, synchronizing the audio feed from the radio to the video feed from the TV may be performed for a setting in which both the radio broadcaster and the TV broadcaster are locally onsite at the live event or onsite in a same location within a predetermined distance/proximity of each other, such as in a same hall, building, or stadium. When the radio broadcaster and the TV broadcaster are close to each other, they may be able to have access to the source of the production audio locally. In some embodiments, as will be further described in relation to FIG. 5, in the scenario where the radio broadcaster and the TV broadcaster are within a threshold proximity of each other, the TV broadcaster may receive a portion of a raw audio stream from the radio broadcaster. This raw audio stream from the radio broadcaster may be encoded and multiplexed with a corelated portion of TV broadcast's video/audio stream and transmitted as a single multiplexed stream to the TV broadcaster's headend. In some instances, the TV broadcasters may have an agreement to include radio broadcasts in their TV programming. In some embodiments, the TV broadcaster's headend may processes the audio, potentially transcoding it for different distribution channels like internet protocol television (IPTV), cable, over-the top (OTT), or TV network affiliates. The TV broadcaster's headend may look for a unique identifier that indicates that the received stream is related to a radio broadcast's audio stream. This unique identifier may be transmitted to the client device such that when the client device detects the unique identifier, it switches from the TV broadcast to the radio broadcasted which is synchronized with the TV broadcast.

In a second embodiment, synchronizing the audio feed/stream from the radio to the video feed/stream from the TV may be performed for a setting in which the radio broadcaster and the TV broadcaster are not geographically located within a proximity of each other. In this scenario, the radio broadcaster may not be sharing their source feed or audio stream with the TV broadcaster. As such in order to synchronize the radio broadcast with the TV broadcast, an embodiment in which clocks associated with the radio broadcast and the TV broadcast are synchronized may be used.

Specifically, in this second embodiment, both broadcasters (radio and TV) may synchronize their clocks using an NTP (Network Time Protocol). In other words, both their clocks may be aligned with each other. They may use a common NTP server or a remote NTP server via the internet to perform the synchronization. Synchronizing the clocks may ensure that the time stamps in the multiplexed audio/video streams match. The synchronization process may utilize a server to synchronize the audio stream associated with the radio broadcast with the video stream of the TV broadcast by causing a clock associated with the radio broadcast to synchronize with a clock associated with the TV broadcast by using a network time protocol (NTP). Once synchronized, a common clock may be generated. The common clock may represent the synchronized time for both the radio broadcast and the TV broadcast. In some embodiments, time stamps generated based on the this generated common clock may be transmitted to an MPEG 7 or KLV metadata generator. The metadata generator may generate time stamps and timing information and embed MPEG 7 pr KLV generated metadata such that the time stamps may be used for synchronization. In other words, the metadata may contain timestamps that help maintain synchronization between audio and visual elements such that they contextually and logically correspond to each other.

When the multiplexer associated with the TV broadcast receives the audio frame data packet associated with the TV broadcast, it may insert the first timestamp for a start of the audio frame data packet associated with the TV broadcast based on the common clock metadata generated by the MPEG 7 or KLV metadata generator. Likewise, when the multiplexer associated with the radio broadcast receives the audio frame data packet associated with the radio broadcast, it may insert the second time stamp for a start of the audio frame data packet associated with the radio broadcast based on the common clock metadata generated by the MPEG 7 or KLV metadata generator. In some embodiments, the audio frames received for the radio and TV broadcast for which a timestamp is inserted may be a first frame.

Both the first data packet with the first timestamp and the audio frame data packet with the second time stamp may be multiplexed together such that their timing is matched based on the common clock. In other words, the timestamps would ensure that the start of the radio broadcast packet correlates with a corresponding scene in the audio frame data packet associated with the TV broadcast such that the audio contextually and logically follows the display. Since the audio packets associated with the radio broadcast may arrive earlier than the audio/video packets associated with the TV broadcast (because TV broadcasting uses more complex processes), the audio packets associated with the radio broadcast may be placed in a buffer until the corresponding audio/video packet from the TV broadcast are received. Once they are received, the video packets, all broadcast TV audio packets and radio packet are sent to the multiplexer. Then and only then are they in sync in the multiplexed stream.

To summarize the above mentioned process of synchronization using common clock timestamp, for the radio broadcast, the first packet for a radio audio frame may have an MPEG7 or KLV metadata packet multiplexed time synced together with the radio audio frame packet and that MPEG7 or KLV metadata packet may include the common clock timestamp. For the TV broadcast, the first packet for a TV audio frame may have an MPEG7 or KLV metadata packet multiplexed time synced together with the TV audio frame packet and that MPEG7 or KLV metadata packet includes the common clock timestamp. Since the first packet of the audio frames for both the radio and TV broadcast have the common timestamp and that MPEG 7 or KLV metadata packet includes the common timestamp, the packets are now synchronized, e.g., the Radio and TV broadcasts are synchronized. In other words, since the first packet of any audio frame from either stream (radio or TV) has MPEG 7 metadata aligned with it, such metadata is used to ensure synchronization between the feeds.

To summarize the above mentioned process of synchronization using common clock timestamp, for the radio broadcast, the first packet for a radio audio frame may have an MPEG7 or KLV metadata packet multiplexed time synced together with a radio audio frame packet and that MPEG7 or KLV metadata packet may include the common clock timestamp. For the TV broadcast, the first packet for a TV audio frame may have an MPEG7 or KLV metadata packet multiplexed time synced together with a TV audio frame packet and that MPEG7 or KLV metadata packet includes the common clock timestamp. In some embodiments, the audio frames referred to above may be a first frame. Since the first packet of the audio frames for both the radio and TV broadcast have the common timestamp and that MPEG 7 or KLV metadata packet includes the common timestamp, the packets are now synchronized, e.g., the Radio and TV broadcasts are synchronized.

Although a certain approach has been described in the second embodiment, the embodiments are not so limited and an AI-based solutions may also be used to synchronize the radio broadcast with the visual components in the TV broadcast while minimizing the impact of potential timing issues. With these measures in place, users may seamlessly transition from a TV broadcast to a radio broadcast and enjoy the more detailed discussion or commentary, such as on a play-by-play basis for a game.

Referring to the TV broadcaster's headend for the second embodiment in which the radio broadcaster and the TV broadcaster are not geographically located within a proximity of each other and the common clock techniques is used, the headend may receive the audio stream from radio broadcaster and the audio/video stream from the TV broadcast. It may then synchronize and multiplex the two streams using a common timestamp derived from the common clock. The synchronized stream may then be transcoded for distribution to various platforms, including IPTV, cable, OTT, and OTA TV affiliates.

Once the radio and TV broadcasts are synchronized, the system may be ready to switch from the TV broadcast to the radio broadcast if a triggering event occurs. The triggering event, in some embodiments, may be a distracted user. The distraction may include any activity performed by the user that is not engaged in consumption of the TV broadcast displayed on the display, such as a TV. The distraction may be detected via smart cameras, head tracking devices, and other devices in the room. For example, the smart cameras may track the user's gaze or head movement to determine that the user is not looking at the TV. Likewise, the user's smartphone may also indicate that the user is playing a game on their smartphone and not consuming the TV broadcast. The triggering event may also be the viewer of the TV broadcast leaving the room. Detection of user leaving the room may be based input from smart cameras detecting the general presence and lack of presence of the viewer in the room or based on Wi-Fi localization techniques that may track the signal of the viewer's smartphone to determine whether the viewer's smartphone has left the room, which would also mean that the viewer has left the room.

Once a determination is made that the triggering event has occurred, e.g., user is distracted or has left the room where the TV broadcast was being displayed (or simply want to switch to radio broadcast while watching TV), in one embodiment, then the client device or a server may switch the audio from the TV to the audio from the radio broadcast (e.g., such as by using the TV speakers or on separate device). In another embodiment, if the user was consuming the TV broadcast on a TV set and is walking away from the room, the system may deliver the audio of the radio broadcast to the user's smartphone such that the user can keep up with the game even when leaving the room.

In an OTT setting, since the user may no longer be consuming the TV broadcast, the bitrate for the TV broadcast may be lowered, unless there are others also in the same room communing the TV broadcast, to save bandwidth. In some embodiments, the lowering of bitrate may be applicable only in an OTT setting. While in other embodiments, it may also be applicable in a multicast adaptive bitrate streaming (ABR) setting.

With respect to OTT/Video-on-demand (VOD) and ABR setting, there may be an option in the adaptive bitrate streaming (ABR) ladder, which may include the audio stream from radio broadcast and the video from the TV broadcast may be reduced to zero bitrate since the video of the TV broadcast may no longer be consumed by the user who has left the room and is no consuming the live event using the radio broadcast. In other words, it may allow for a time-shifted radio broadcast, which is aligned with the OTT streaming, for anyone who may experience a low bandwidth or significant bandwidth fluctuation.

Turning now to the figures, FIG. 1 is a block diagram of an example of a process 100 for synchronizing radio broadcast with TV broadcast and switching from radio to TV broadcast upon detecting a trigger, in accordance with some embodiments of the disclosure. In some embodiments, at block 101, a server, such as the server 202 in FIG. 2, using control circuitry 220, and/or a device 218 using control circuitry 228, may access a radio broadcast and a TV broadcast of a live game. As described earlier, the live event may be a game, such as a basketball, soccer, football, tennis, rugby, baseball, cricket, golf, ice or field hockey, volleyball, etc. The live event may also be a parade, such as the new year's parade in New York City, thanksgiving parade, Superbowl or NBA winner parade, etc. It may also be any other type of live event or gathering, such as a political rally, for which a radio and a TV broadcast is provided.

At block 102, a determination may be made whether the radio broadcaster associated with the radio broadcaster and the TV broadcaster associated with the TV broadcast are located in a same location or at different locations. When a radio broadcaster and a TV broadcaster are both located in the same area or within a predetermined proximity of each other, for example, at a sporting event (e.g., at the same 49ers football game or Warriors basketball game), in the same building, or even at the same studio (such as TNT studios), they are considered to be in the same location. In some embodiments, being local or in same location refers to the on-site broadcasters having the ability to run a wire from the radio broadcaster's microphone processing system directly into an audio encoder at the TV encoding and multiplexing location, which may be, for example, 25-50 ft away. As such, being local also refers to having a dedicated on-site audio encoder or feed from the microphone processing system from the radio audio at the TV broadcaster's location. In this scenario in which the radio broadcaster is physically being connected by a wire to TV broadcast that is on-site, the radio broadcast's feed may be directly provided to the TV broadcaster. At the same time, the on-site broadcasters may also send their feeds to the broadcaster's headend, which is always remote (e.g., at a TV and/or Radio station).

In yet other embodiments, the radio broadcaster and the TV broadcaster may be considered to be in a same location if they can transmit their broadcasts locally without relying on satellite technology. Since transmission of a broadcast relies on types of strength of transmitters used, type of transmission frequency used, and any obstacles and surrounding conditions, such as weather, if the signal from the radio broadcaster or the TV broadcaster can reach each other with enough signal strength to have a clear and uninterrupted transmission, without having to use a satellite, such as by using terrestrial transmissions (e.g., radio waves, fiber optics, Bluetooth, Wi-Fi, Near-Field communications (NFC)), then such locations may be considered to be a same location. For example, even though the radio and TV broadcaster may be located a few meters, few blocks, from each other, or on opposite ends of a stadium, or opposite ends of a large Olympic sports complex, as long as they reach of each other's signal at the frequency propagates can reach each other without a satellite, for the purposes of the selecting a synchronization technique to be used, they may be considered to be local or at same location and their local transmission may be used for synchronization.

If a determination is made that the radio broadcaster and the TV broadcaster are at the same location, which may or may not be at the site of the live event, then the synchronization and multiplexing technique described at block 102A may be used. In some embodiments, using this technique of synchronization (as described in block 102A), which is described in further detail at least in FIGS. 4-6 and 10, may include locally transmitting an audio stream associated with the radio broadcast the TV broadcast system via an uplink. Since both the radio broadcaster and TV broadcaster may be considered to be at the same location, as described above, such a transmission of the audio stream from the radio broadcaster may be transmitted based on signal strength of the transmitter user and the frequency used by radio broadcast system associated with the radio broadcaster and without having to use a satellite. In another embodiment, using this technique of synchronization may include physically connecting the microphone of the radio broadcaster to the dedicated encoder of the TV broadcaster and then using the wired connection to transmit the radio feed or radio's audio stream to the TV broadcaster.

Once the audio stream, or a portion of the audio stream, associated with the radio broadcast is received by the TV broadcaster system, via an uplink, the TV broadcaster system may have dedicated audio encoders for encoding the received audio stream. In some embodiments, the TV broadcast system may clean up the raw feed of the audio stream, such as by transcoding it or removing certain words are pieces of conversation that are not suitable according to the TV broadcaster system policies, and then encode the audio stream received from the radio broadcast.

In some embodiments, the TV broadcaster system may then generate a single multiplexed content stream that includes both the encoded radio broadcast and the TV broadcast, i.e., the radio broadcaster's audio stream multiplexed with the TV broadcaster's video/audio stream. The TV broadcast system may then transmit the single multiplexed content stream to its headend for transmission to a client device. In some embodiments, the TV broadcaster's headend may further processes the audio, potentially transcoding it for different distribution channels like IPTV, cable, OTT, or TV network affiliates. The TV broadcaster's headend may look for a unique identifier that indicates that the received stream is related to a radio broadcast's audio stream. This unique identifier may be transmitted to the client device such that when the client device detects the unique identifier, it switches from the TV broadcast to the radio broadcasted which is synchronized with the TV broadcast.

In some embodiments, at block 102, a determination may be made that the radio broadcaster associated with the radio broadcaster and the TV broadcaster associated with the TV broadcast are not located in the same location or within a proximate distance from each other that would allow then to use location transmission and as such have to rely on satellite transmission. When the local transmission may not reach the other broadcaster and satellite transmission may need to be used to transmit the radio broadcast to the TV broadcaster system, or vice versa, then the synchronization and multiplexing technique described at block 102B may be used.

Figure 4:
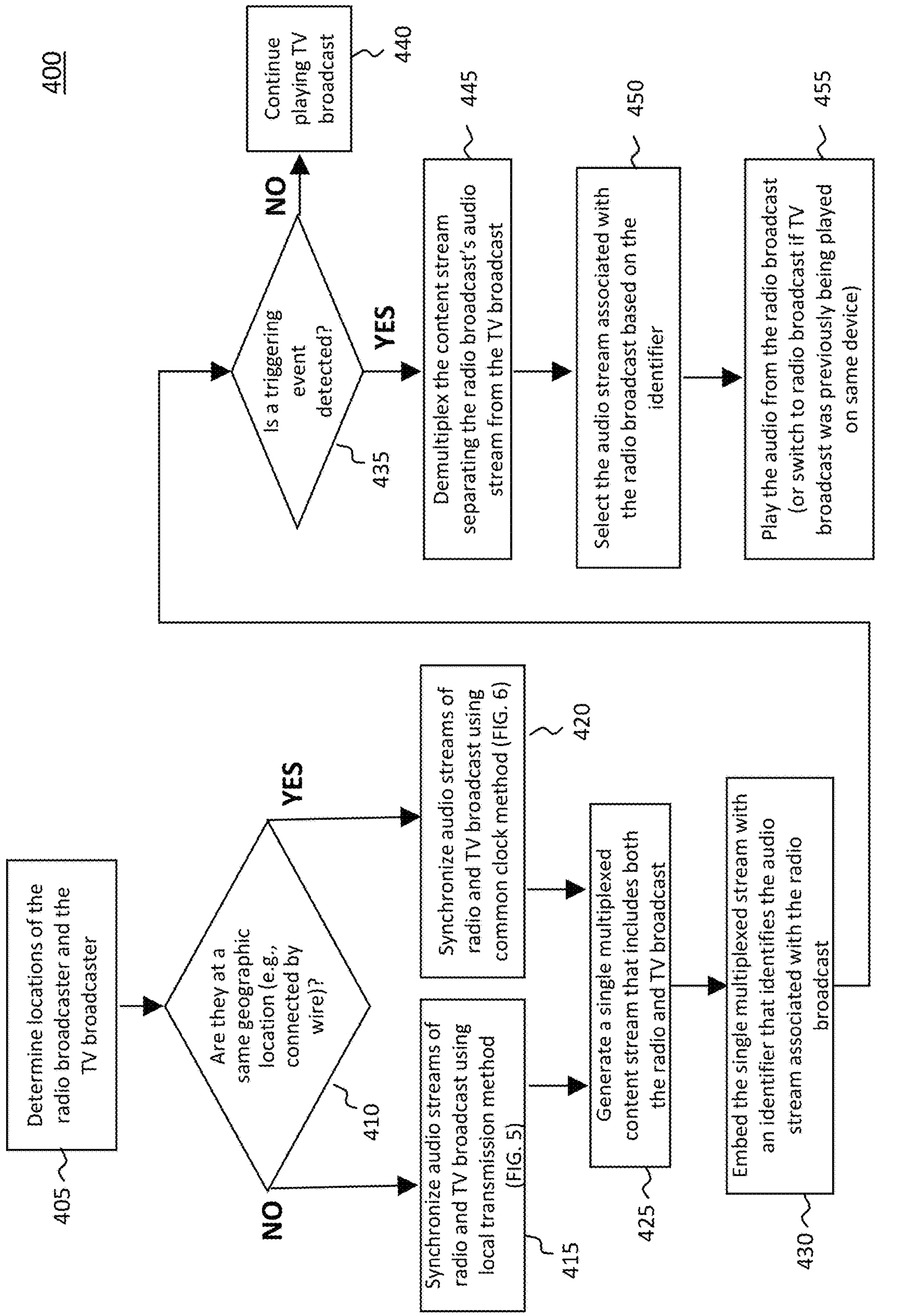
FIG. 4 is a flowchart of a process for synchronizing radio broadcast with TV broadcast and switching from radio to TV broadcast upon detecting a trigger, in accordance with some embodiments of the disclosure.
Figure 7:
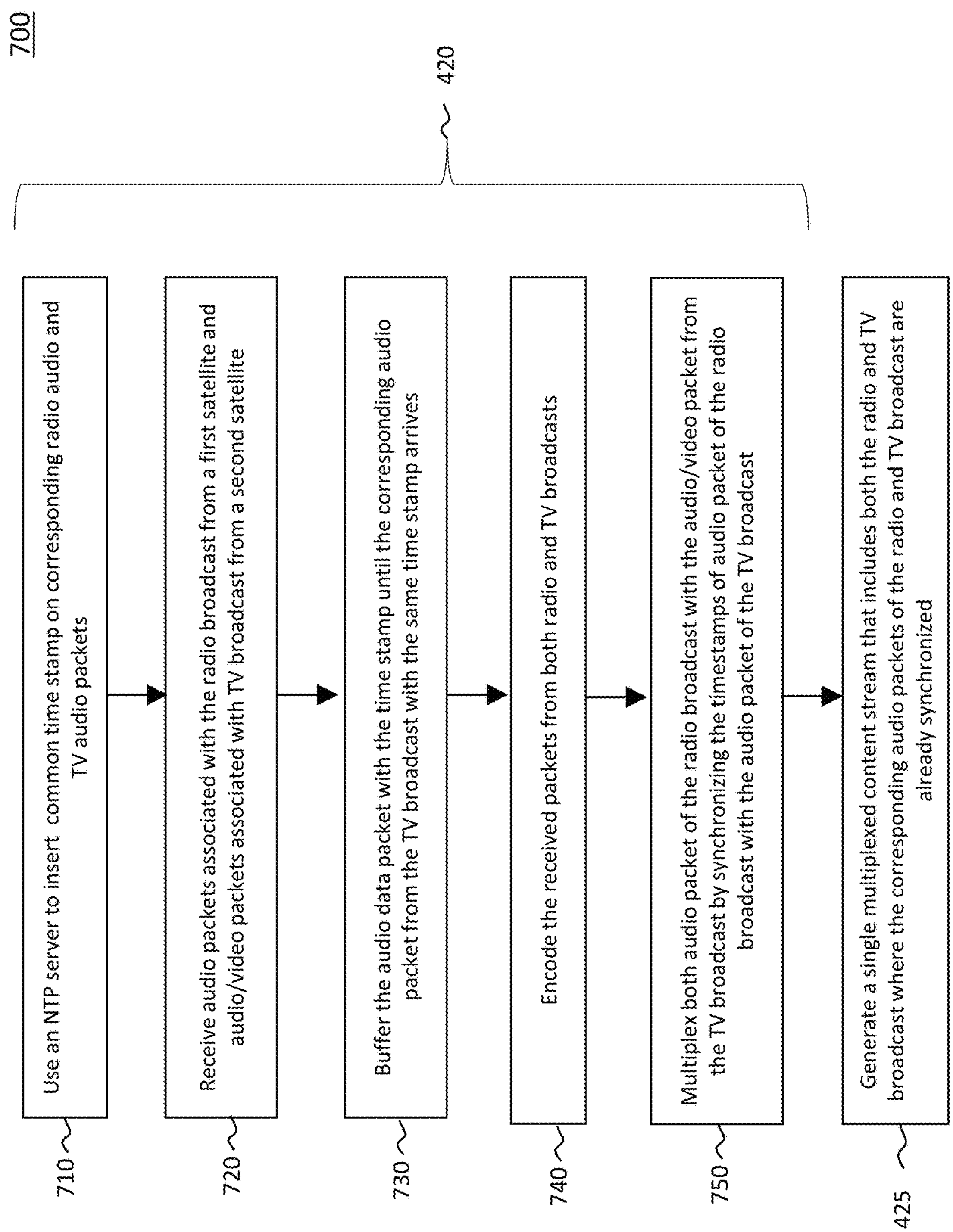
FIG. 7 is a flowchart of a process for synchronizing radio broadcast with TV broadcast when the radio and TV broadcasters are at different location where they cannot user local transmission to broadcast to one another, in accordance with some embodiments of the disclosure.
Figure 11:
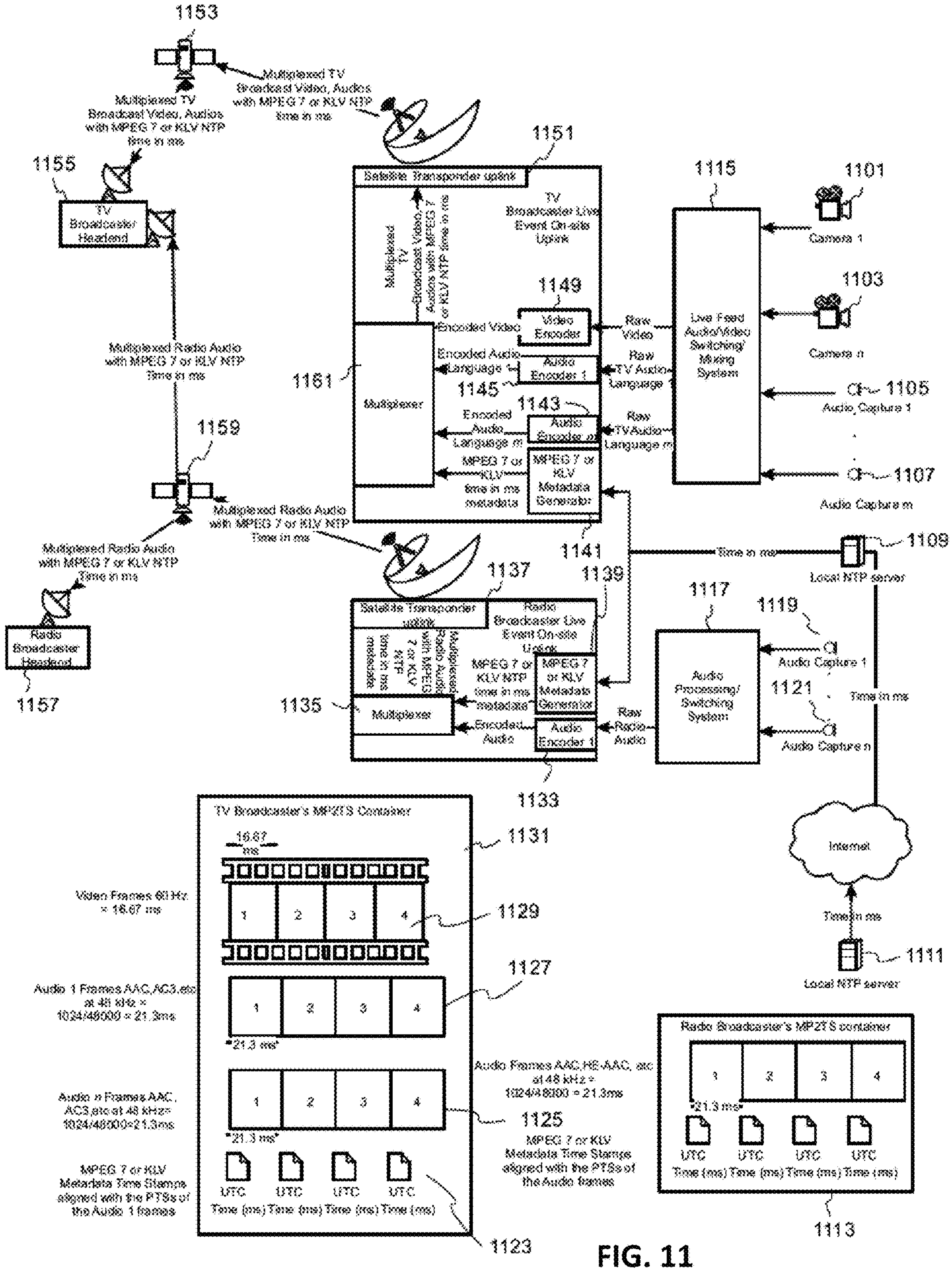
FIG. 11 depicts an architecture for synchronizing radio broadcast with TV broadcast when the radio and TV broadcasters are at different location where they cannot user local transmission to broadcast to one another, in accordance with some embodiments of the disclosure.

In some embodiments, using this technique of synchronization (as described in block 102B), which is described in further detail at least in FIGS. 4, 7, and 11, data packets from the audio stream associated with the radio broadcast may be synchronized with data packets from the audio stream of the TV broadcast (since the audio and video of the TV broadcast may already be synchronized with each other). To synchronize the audio from a radio broadcast with the TV broadcast, in the case where the radio and TV broadcasters are in different locations and local transmission is not available due to distances between the different locations, synchronization process may involve synchronizing the clocks associated with each broadcast. This is especially true when the radio broadcaster is not sharing their audio feed directly with the TV broadcaster. By ensuring that both broadcasts are aligned in time, the audio and video can be seamlessly combined.

Specifically, in this second embodiment, both broadcasters (radio and TV) may synchronize their clocks using an NTP (Network Time Protocol). In other words, both their clocks may be aligned with each other. They may use a common NTP server or a remote NTP server via the internet to perform the synchronization. Synchronizing the clocks may ensure that the timestamps in the multiplexed audio/video streams match. The synchronization process may utilize a server, such as the server in FIG. 2, that uses network time protocol (NTP) to align the clocks of the radio and TV broadcasts. This creates a shared time reference. A metadata generator, such as one using MPEG 7 or KLV standards, may then generate timestamps based on this common clock. These timestamps may be embedded into the broadcast data packets, ensuring that the audio and TV broadcasts, more specifically, the audio from the radio broadcast and the audio from the TV broadcast, are synchronized and correspond to each other in a logical and contextual manner.

In some embodiments, when the multiplexer for the TV broadcast system receives the initial audio frame, it may insert a timestamp based on the common clock metadata, which may be generated by the MPEG 7 or KLV metadata generator. Similarly, the multiplexer for the radio broadcast may insert the timestamp to its audio frame, also using the common clock. In other embodiments, instead of the multiplexer, a server associated with the TV broadcast or an NTP server may insert all the timestamps in the packets related to the radio and TV broadcast. These timestamps are used to synchronize the audio stream from the radio broadcast with the audio stream of the TV broadcast.

As described earlier, in this embodiment where the radio and TV broadcaster are at separate locations, both the first data packet with the time stamp and the audio frame data packet with the time stamp, both of which have the exact same time, may be multiplexed together such that their timing is matched based on the common clock. In other words, the timestamps would ensure that the start of the radio broadcast packet correlates with a corresponding scene in the audio frame data packet associated with the TV broadcast such that the audio contextually and logically synchronizes with the video.

In some embodiments, to account for potential delays in the TV broadcast, the radio packets may be temporarily stored in a buffer. This ensures that the audio and video components may be sent to the multiplexer for distribution to TV service providers or delivery to a live TV viewing device at the same time. The radio audio is held until a matching timestamp is received from the TV broadcast. Once the audio and video packets are synchronized, they are combined into a single multiplexed stream.

Although a certain approach has been described in the second embodiment, the embodiments are not so limited and an AI-based solutions may also be used to synchronize the radio broadcast with the visual components in the TV broadcast while minimizing the impact of potential timing issues. With these measures in place, users may seamlessly transition from a TV broadcast to a radio broadcast and enjoy the more detailed discussion or commentary, such as on a play-by-play basis for a game.

Referring to the TV broadcaster's headend for the second embodiment in which the radio broadcaster and the TV broadcaster are not geographically located within a proximity of each other and the common clock techniques is used, the headend may receive the audio stream from radio broadcaster and the audio/video stream from the TV broadcast. It may then synchronize and multiplex the two streams using a common timestamp derived from the common clock. The synchronized stream may then be transcoded for distribution to various platforms, including IPTV, cable, OTT streaming, and OTA TV affiliates. Additional detail relating to multiplexing radio broadcast and content from OTT streaming is described in FIG. 9.

Once the audio and video packets are synchronized, they are combined into a single multiplexed stream, which may be in an MPEG-2 TS (transport stream) format.

Figure 2:
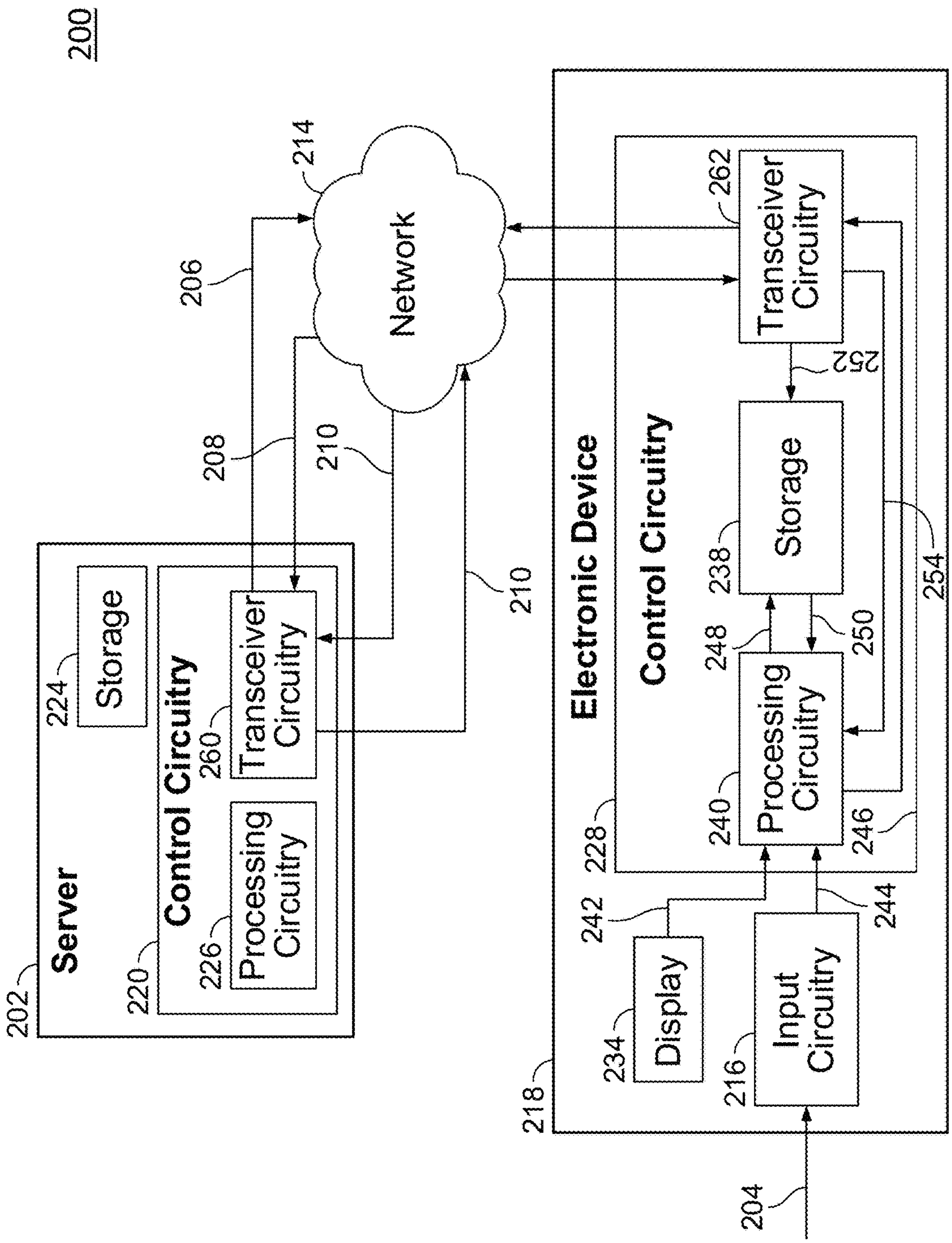
FIG. 2 is a block diagram of a system for synchronizing radio broadcast with TV broadcast and switching from radio to TV broadcast upon detecting a trigger, in accordance with some embodiments of the disclosure.

At block 103, the control circuitry, such as control circuitry 220 and/or 228 of FIG. 2, monitor and detect a triggering event. A triggering event may occur when a viewer that is consuming the TV broadcast is distracted or leaves the room. Distractions may include activities like answering a phone call, talking to someone else, or being distracted by someone entering the room. Even in a room with multiple viewers, the triggering event only occurs when the person actively watching the TV broadcast is distracted. Loud noises or conversations among multiple people can also trigger the event if they prevent the viewer from focusing on the broadcast. If a child is in the room who is not focused on consuming the TV broadcast, but a viewer is, and the child leaves the room, the system may distinguish an uninterested person in the room from the interested user/viewer and the leaving of the uninterested person may not be regarded as a triggering event.

If a determination is made at block 103 that the triggering condition or event has occurred, then the process may move to block 104 where the single multiplexed stream may be transmitted to the user device. For example, the user device may be a smartphone, a tablet computer, or any other electronic device on which the user can consume the audio of the radio broadcast. The transmitted single stream may include an identifier that identifies the stream as including a radio broadcast. More specifically, it may include a certain PID number to identify that the stream includes an audio component of a radio broadcast. Upon detecting the identifier, the user device may start playing the radio broadcast to the user. In some embodiments, if the user device was previously playing the TV broadcast, once it receives the triggering event and detects the identifier associated the radio broadcast, it may switch the audio playback from the TV broadcast to the radio broadcast. The radio broadcast played may be already synchronized with the TV broadcast, such that if the user were to play the audio from the radio broadcast while consuming the video from the TV broadcast, they would each correlate with each other. For example, if the radio broadcast is discussing a particular play of the game, the same particular play may also be displayed on the TV at the same time.

If a determination is made at block 103 that the triggering event has not occurred, then the TV broadcast may be continued to be played for the viewer. Further details relating to determining user distraction and whether the user is watching the TV broadcast on a screen and accordingly determine whether to play the radio or TV broadcast is described in FIG. 8.

In some embodiments, the user may continue to change their listening/viewing status. For example, the user may exit the room where the TV is playing the TV broadcast to go to another room and then return back to the room where the TV is playing. As such, the broadcast may also be switched back and forth automatically. For example, when the user exits the room where a media device, such as a TV, is playing the TV broadcast to go to another room, so that the user does not miss out on the live event, such as the game, the system may detect the trigger condition and switch to a radio broadcast delivered to the user's smartphone. As such the user may continue to monitor the game via the switched broadcast delivered to their smartphone and the transmission may be smooth and in real-time. The system may also track the location to which the user moved, such as the bedroom, and if there are speakers available in the bedroom, automatically access the speakers in the bedroom and play the radio broadcast. When the user returns to the room where the TV is playing the TV broadcast, then the system may once again switch from the radio broadcast to the TV broadcast. Likewise, the system may monitor changes in the triggering condition and automatically switch between the radio and TV broadcast, which are synchronized, to follow the changes in the triggering condition.

Figure 3:
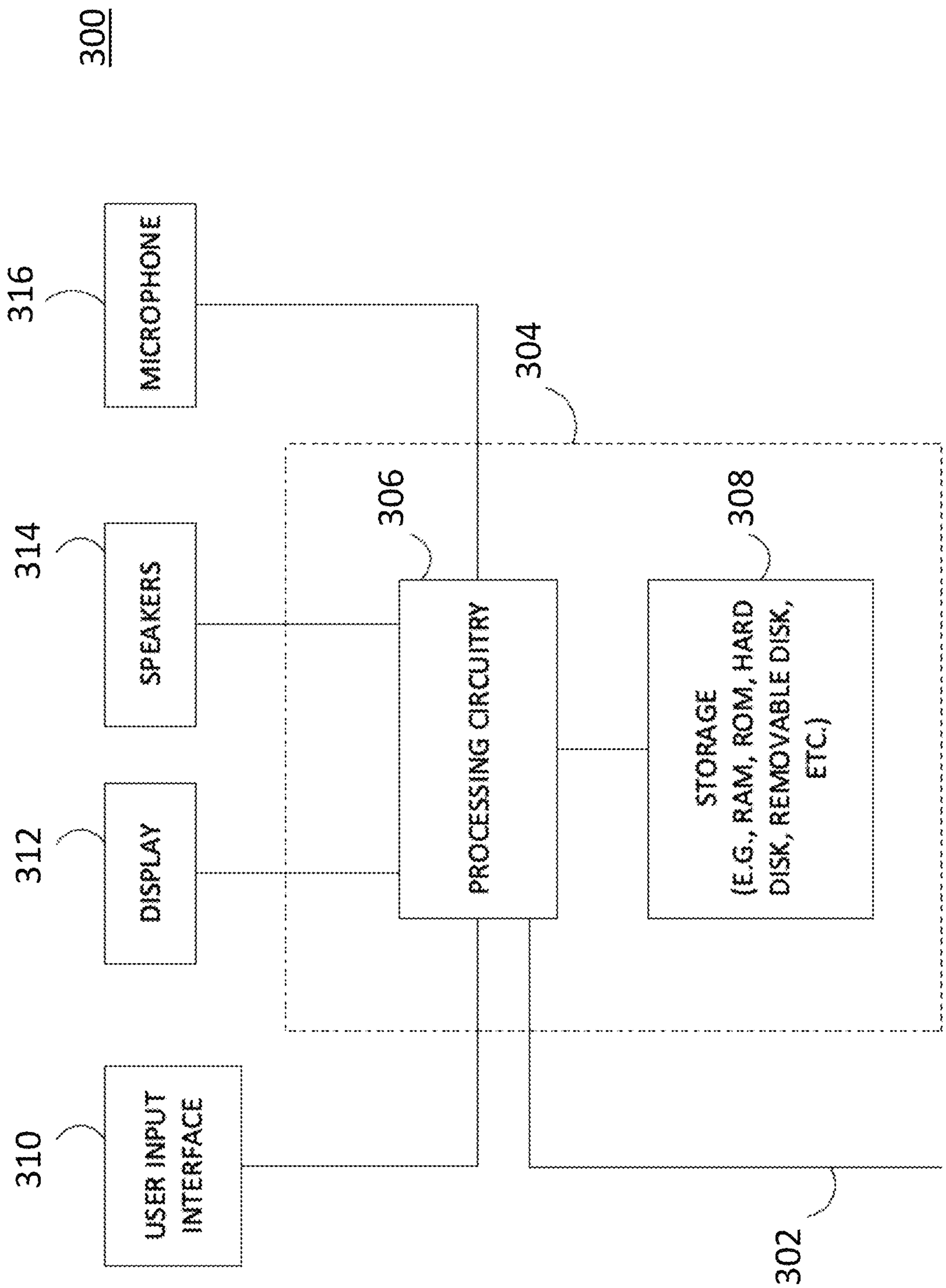
FIG. 3 is a block diagram of a user device used for consuming radio and/or TV broadcast and switching between broadcasts, in accordance with some embodiments of the disclosure.

FIG. 2 is a block diagram of a system for synchronizing radio broadcast with TV broadcast and switching the audio playback from radio to TV broadcast upon detecting a trigger, in accordance with some embodiments of the disclosure and FIG. 3 is a block diagram of a user device used for consuming radio and/or TV broadcast and switching the audio playback between broadcasts, in accordance with some embodiments of the disclosure.

FIGS. 2 and 3 also describe example devices, systems, servers, and related hardware that may be used to implement processes, execute user interface operations, and all other steps, functions and functionalities described at least in relation to FIGS. 1, and 4-18C.

Further, FIGS. 2 and 3 may also be used for synchronizing radio broadcast with a TV broadcast and more specifically, accessing a radio broadcast and a TV broadcast of a live event, synchronizing the radio broadcast with the TV broadcast by synchronizing a portion of an audio stream associated with the radio broadcast with a portion of an audio stream associated with the TV broadcast, multiplexing the synchronized portion of the audio stream associated with the radio broadcast and the portion of the audio and video streams associated with the TV broadcast as a single multiplexed stream, and transmitting the single multiplexed stream to a client device either in response to detecting a triggering event or upon user request, using a different synchronization method based on the location of the radio and TV broadcasters. FIGS. 2 and 3 may also be used for synchronizing the radio broadcast with the TV broadcast when the radio and TV broadcasters are local to each other, such as being connected by a wire where the radio broadcaster's microphone can be physically connected via a wire to the TV broadcaster's encoders, or when signal from the radio broadcasters can be received by the dedicated encoders of the TV broadcasters with via the wire or other means that do not use satellite communications, by transmitting the audio portion of the radio broadcast to the encoders associated with the TV broadcast, synchronizing the audio portion of the radio broadcast with the audio of the TV broadcast, multiplexing the audio of the radio broadcast with the audio and video of the TV broadcast, and transmitting it as a single stream. FIGS. 2 and 3 may also be used for synchronizing the radio broadcast with the TV broadcast when satellite communications between the broadcasters is used to transmit radio broadcast to the TV broadcaster, the synchronization method used in this circumstance involving using common clock timestamp which involves, for the radio broadcast, the first packet for a radio audio frame having an MPEG7 or KLV metadata packet multiplexed time synced together with a radio audio frame packet and that MPEG7 or KLV metadata packet and including the common clock timestamp. Likewise, for the TV broadcast, the first packet for a TV audio frame having an MPEG7 or KLV metadata packet multiplexed time synced together with the TV audio frame packet and that MPEG7 or KLV metadata packet including the common clock timestamp. FIGS. 2 and 3 may also be used for monitoring and detecting triggering events and changes in triggering events using variety of devices to switch from radio to TV or TV to radio synchronized broadcasts accordingly, where the triggering events may include distractions, the user leaving a room where the TV broadcast is being displayed, the user re-entering the room which the user left earlier in which the TV broadcast is being displayed, or the user requesting to switch to a radio broadcast. FIGS. 2 and 3 may also be used for performing functions related to all other processes and features described herein.

In some embodiments, one or more parts of, or the entirety of system 200, may be configured as a system implementing various features, processes, functionalities and components of FIGS. 1, and 4-18C. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content (e.g., PID identifiers associated with an audio stream, common clock timestamps, metadata generated by MPEG 7 or KLV metadata generators, locations of the radio and TV broadcasters, user preferences for radio and TV broadcast, triggering event conditions, algorithms associated with switching from radio to TV or TV to radio broadcasts, bitrates associated with streams, and, AI and ML algorithms). Non-volatile memory may also be used (e.g., to launch a boot-up routine, launch an app, render an app, and other instructions). Cloud-based storage may be used to supplement storages 224, 238 or instead of storages 224, 238. In some embodiments, data relating to PID identifiers associated with an audio stream, common clock timestamps, metadata generated by MPEG 7 or KLV metadata generators, locations of the radio and TV broadcasters, user preferences for radio and TV broadcast, triggering event conditions, algorithms associated with switching from radio to TV or TV to radio broadcasts, bitrates associated with streams, and, AI and ML algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to detecting that satellite communications are used for broadcasting the radio broadcast to the TV broadcaster, the control circuitry 228 using a process of synchronization that uses a common clock timestamp for synchronizing the radio broadcast with the TV broadcast. The control circuitry 228 may also perform steps of processes described in FIGS. 1, 4-5, and 7-17.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as data relating to PID identifiers associated with an audio stream, common clock timestamps, metadata generated by MPEG 7 or KLV metadata generators, locations of the radio and TV broadcasters, user preferences for radio and TV broadcast, triggering event conditions, algorithms associated with switching from radio to TV or TV to radio broadcasts, bitrates associated with streams, and, AI and ML algorithms and input from primary devices and secondary devices, such as microphones associated with a radio broadcaster. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be an electronic device, a personal computer (PC), a laptop computer, a tablet computer, a WebTV box, a personal computer television (PC/TV), a PC media server, a PC media center, a handheld computer, a mobile telephone, a smartphone, or any other device, computing equipment, or wireless device, and/or combination of the same capable of suitably synchronizing radio and TV broadcasts and switching between the two based on triggering conditions. Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 218 is configured for synchronizing radio broadcast with a TV broadcast and more specifically, accessing a radio broadcast and a TV broadcast of a live event, synchronizing the radio broadcast with the TV broadcast by synchronizing a portion of an audio stream associated with the radio broadcast with a portion of an audio stream associated with the TV broadcast, multiplexing the synchronized portion of the audio stream associated with the radio broadcast and the portion of the audio and video streams associated with the TV broadcast as a single multiplexed stream, and transmitting the single multiplexed stream to a client device either in response to detecting a triggering event or upon user request, using a different synchronization method based on the location of the radio and TV broadcasters. The control circuitry 220 and/or control circuitry 218 may also be configured for may also be used for synchronizing the radio broadcast with the TV broadcast when the radio and TV broadcasters are local to each other, such as being connected by a wire where the radio broadcaster's microphone can be physically connected via a wire to the TV broadcaster's encoders, or when signal from the radio broadcasters can be received by the dedicated encoders of the TV broadcasters with via the wire or other means that do not use satellite communications, by transmitting the audio portion of the radio broadcast to the encoders associated with the TV broadcast, synchronizing the audio portion of the radio broadcast with the audio of the TV broadcast, multiplexing the audio of the radio broadcast with the audio and video of the TV broadcast, and transmitting it as a single stream. The control circuitry 220 and/or control circuitry 218 may also be configured for synchronizing the radio broadcast with the TV broadcast when satellite communications between the broadcasters is used to transmit radio broadcast to the TV broadcaster, the synchronization method used in this circumstance involving using common clock timestamp which involves, for the radio broadcast, the first packet for the a radio audio frame having an MPEG7 or KLV metadata packet multiplexed time synced together with a radio audio frame packet and that MPEG7 or KLV metadata packet and including the common clock timestamp. Likewise, for the TV broadcast, the first packet for a TV audio frame having an MPEG7 or KLV metadata packet multiplexed time synced together with a TV audio frame packet and that MPEG7 or KLV metadata packet including the common clock timestamp. The control circuitry 220 and/or control circuitry 218 may also be configured for monitoring and detecting triggering events and changes in triggering events using variety of devices to switch from radio to TV or TV to radio synchronized broadcasts accordingly, where the triggering events may include distractions, the user leaving a room where the TV broadcast is being displayed, the user re-entering the room which the user left earlier in which the TV broadcast is being displayed, or the user requesting to switch to a radio broadcast. The control circuitry 220 and/or control circuitry 218 may also be configured for performing functions related to all other processes and features described herein.

Computing device 218 receives a user input 204 at input circuitry 216. For example, computing device 218 may receive data relating to occurrence of a triggering condition in response to which the broadcast is to be switched from the TV broadcast to the synchronized radio broadcast.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, 5G sidelink (5G NRV2X), 6G, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, Wi-Fi, WiMAX, GSM, UTMS, CDMA, TDMA, 3G, 4G, 4G LTE, or other wireless transmission protocols.

Processing circuitry 240 may receive input 204 from input circuitry 216. Processing circuitry 240 may convert or translate the received user input 204 that may be in the form of voice input into a microphone. In some embodiments, input circuitry 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 4-5, and 7-17, respectively.

FIG. 3 is a block diagram of a user device used for consuming radio and/or TV broadcast and switching the audio playback between broadcasts, in accordance with some embodiments of the disclosure. In an embodiment, the equipment device 300, is the same equipment device 202 of FIG. 2. The equipment device 300 may receive content and data via input/output (I/O) path 302. The I/O path 302 may provide audio content (e.g., such from a microphone associated with a radio broadcast). The control circuitry 304 may be used to send and receive commands, requests, and other suitable data using the I/O path 302. The I/O path 302 may connect the control circuitry 304 (and specifically the processing circuitry 306) to one or more communications paths or links (e.g., via a network interface), any one or more of which may be wired or wireless in nature. Messages and information described herein as being received by the equipment device 300 may be received via such wired or wireless communication paths. I/O functions may be provided by one or more of these communications paths or intermediary nodes but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor). In client-server-based embodiments, the control circuitry 304 may include communications circuitry suitable for synchronizing radio broadcast with a TV broadcast and more specifically, accessing a radio broadcast and a TV broadcast of a live event, synchronizing the radio broadcast with the TV broadcast by synchronizing a portion of an audio stream associated with the radio broadcast with a portion of an audio stream associated with the TV broadcast, multiplexing the synchronized portion of the audio stream associated with the radio broadcast and the portion of the audio and video streams associated with the TV broadcast as a single multiplexed stream, and transmitting the single multiplexed stream to a client device either in response to detecting a triggering event or upon user request, using a different synchronization method based on the location of the radio and TV broadcasters. The control circuitry 304 may also include communications circuitry suitable for synchronizing the radio broadcast with the TV broadcast when the radio and TV broadcasters are local to each other, such as being connected by a wire where the radio broadcaster's microphone can be physically connected via a wire to the TV broadcaster's encoders, or when signal from the radio broadcasters can be received by the dedicated encoders of the TV broadcasters with via the wire or other means that do not use satellite communications, by transmitting the audio portion of the radio broadcast to the encoders associated with the TV broadcast, synchronizing the audio portion of the radio broadcast with the audio of the TV broadcast, multiplexing the audio of the radio broadcast with the audio and video of the TV broadcast, and transmitting it as a single stream. The control circuitry 304 may also include communications circuitry suitable for synchronizing the radio broadcast with the TV broadcast when satellite communications between the broadcasters is used to transmit radio broadcast to the TV broadcaster, the synchronization method used in this circumstance involving using common clock timestamp which involves, for the radio broadcast, the first packet for a radio audio frame having an MPEG7 or KLV metadata packet multiplexed time synced together with a radio audio frame packet and that MPEG7 or KLV metadata packet and including the common clock timestamp. Likewise, for the TV broadcast, the first packet for a TV audio frame having an MPEG7 or KLV metadata packet multiplexed time synced together with the TV audio frame packet and that MPEG7 or KLV metadata packet including the common clock timestamp. The control circuitry 304 may also include communications circuitry suitable for monitoring and detecting triggering events and changes in triggering events using variety of devices to switch from radio to TV or TV to radio synchronized broadcasts accordingly, where the triggering events may include distractions, the user leaving a room where the TV broadcast is being displayed, the user re-entering the room which the user left earlier in which the TV broadcast is being displayed, or the user requesting to switch to a radio broadcast. The control circuitry 304 may also include communications circuitry suitable for performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store various types of content, (e.g., PID identifiers associated with an audio stream, common clock timestamps, metadata generated by MPEG 7 or KLV metadata generators, locations of the radio and TV broadcasters, user preferences for radio and TV broadcast, triggering event conditions, algorithms associated with switching from radio to TV or TV to radio broadcasts, bitrates associated with streams, and, AI and ML algorithms). Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing.

The electronic device 300 may include an interface 310. The interface 310 may be any suitable user interface, such as a remote control, mouse, trackball, keypad, keyboard, touchscreen, touchpad, stylus input, joystick, or other user input interfaces. A display 312 may be provided as a stand-alone device or integrated with other elements of the electronic device 300. For example, the display 312 may be a touchscreen or touch-sensitive display.

In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to transmitting broadcast data to each other, and synchronizing and multiplexing radio broadcast with TV broadcast, and implementing machine learning (ML) and artificial intelligence (AI) algorithms, and all the functionalities discussed associated with the figures mentioned in this application.

FIG. 4 is a flowchart of a process for synchronizing radio broadcast with TV broadcast and switching from radio to TV broadcast upon detecting a trigger, in accordance with some embodiments of the disclosure. The process 400 may be implemented, in whole or in part, by systems or devices such as those shown in FIGS. 2 and 3. One or more actions of the process 400 may be incorporated into or combined with one or more actions of any other process or embodiments described herein. The process 400 may be saved to a memory or storage (e.g., any one of those depicted in FIGS. 2 and 3) as one or more instructions or routines that may be executed by a corresponding device or system to implement the process 400.

At block 405, in some embodiments, the control circuitry 220 and/or 228 may determine locations of radio broadcaster and the TV broadcaster. In some embodiments, with respect to their locations, a determination may be made whether the locations of the radio and TB broadcasters that are on-site at a game (or within close vicinity of each other) are close enough to a physical wire from the radio broadcaster's microphone processing system directly into an audio encoder at the TV encoding and multiplexing location, which may be, for example, 25-50 ft away. Since the TV broadcaster may have dedicated on-site audio encoder to receive the feed from the radio broadcaster's microphone and encode it, it may not to use satellite communication, which adds further delay. As described earlier, in this scenario in which the radio broadcaster's microphone is physically being connected by a wire to TV broadcast that is on-site, the radio broadcast's feed may be directly provided to the TV broadcaster with little or no delay.

In yet other embodiments, instead of being physically connected through a wire, or being connected through a satellite, the radio broadcaster and the TV broadcaster may be wirelessly connected through other forms of terrestrial transmissions (e.g., radio waves, fiber, Bluetooth, Wi-Fi, Near-Field communications (NFC)), etc.) In some embodiments, the control circuitry 220 and/or 228 may determine a) whether the radio and TV broadcasters can be physically connected via a wire with each other, or via terrestrial transmissions, or b) are farther apart and would need to use satellite transmissions to broadcast ether other's feeds to the other.

Figure 5:
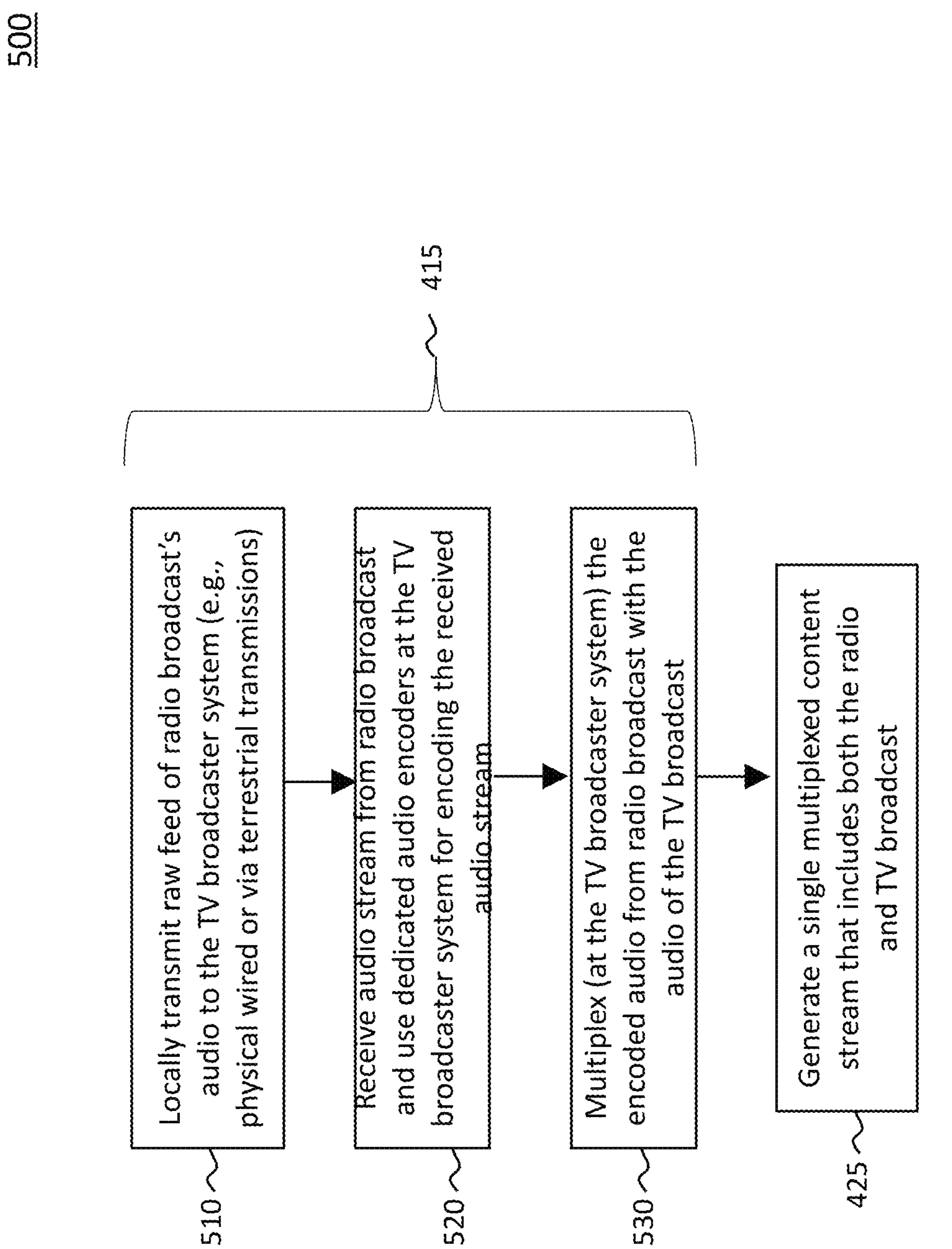
FIG. 5 is a flowchart of a process for synchronizing radio broadcast with TV broadcast when both the radio and TV broadcasters are at a same location or within local transmission distance of each other, in accordance with some embodiments of the disclosure.

At block 410, if a determination is made that the radio and TV broadcast are not physically connected via a wire, or that the radio broadcaster's transmitter and the TV broadcaster's transmitter is not in the same geographical location, then a process may move to block 415 and use the method of synchronization as described in FIG. 5. As described earlier, radio broadcaster's transmitter and the TV broadcaster's transmitter not being in the same geographical location would mean that the transmitters are not close enough in distance, or not close enough to receive each other's signal at a predetermined signal strength that may be allow for a clear transmission. The radio and TV broadcaster not being in same location may also be due to inability for them to physically connect to each other (e.g., the radio broadcaster's microphone wire physically connected to the TV broadcaster's encoder). Accordingly, it would also mean that the radio broadcaster and the TV broadcaster cannot share their feeds using a physical wire or local transmission (via terrestrial transmissions) and may have to use satellite transmission to share them. The method of synchronization, as described in FIG. 5, may include transmitting radio broadcaster's raw feed via local transmission or physical wire to the TV broadcaster system, where the radio broadcaster's audio feed may be encoded, synchronized, and multiplexed with the audio of the TV broadcast.

Figure 6:
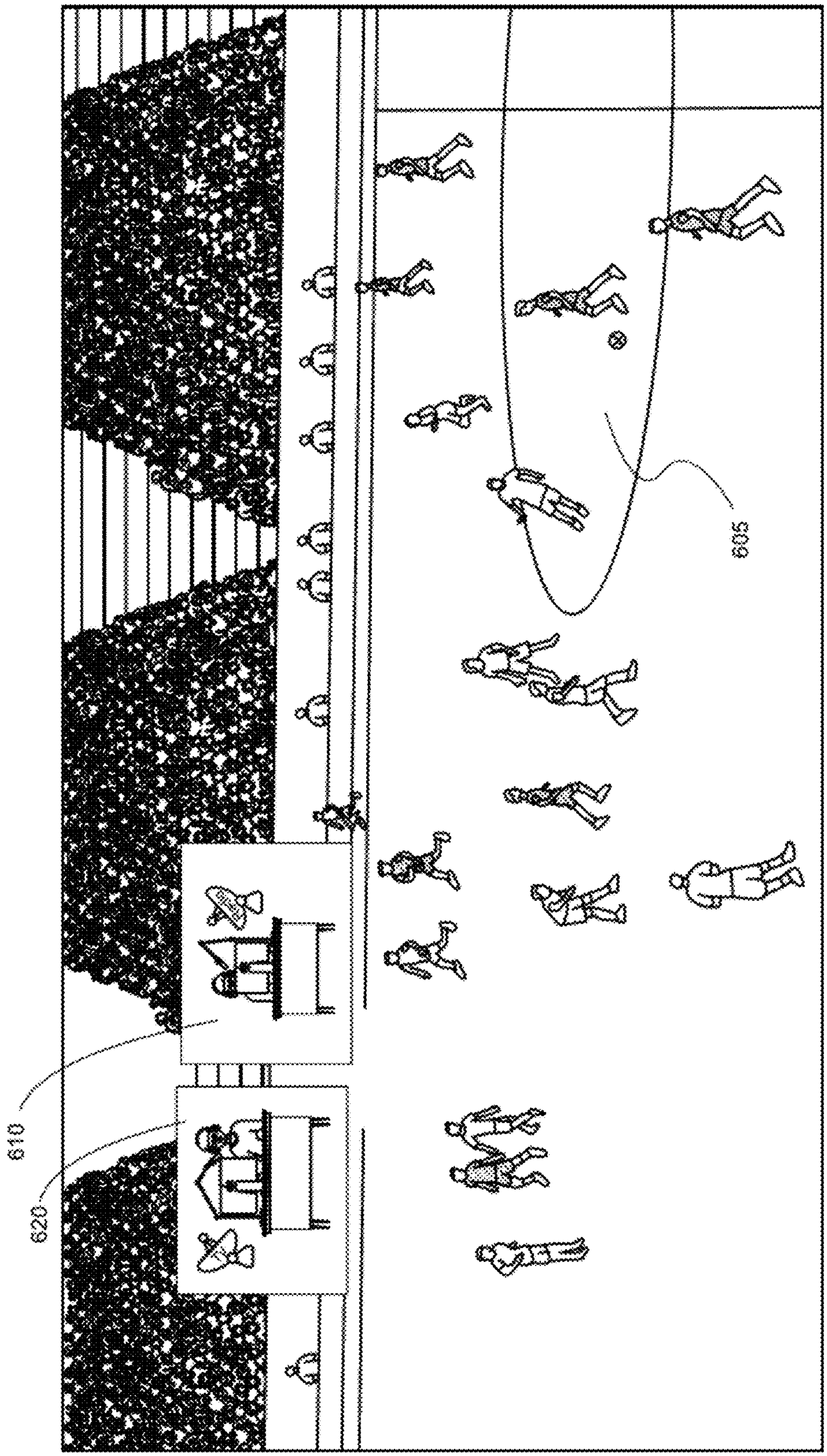
FIG. 6 is an example of the radio and TV broadcasters at a same location, in accordance with some embodiments of the disclosure.

At block 410, if a determination is made that the radio broadcaster's transmitter and the TV broadcaster's transmitter are in the same geographical location, then a process may move to block 420 and use the method of synchronization as described in FIG. 6. As describer earlier, radio broadcaster's transmitter and the TV broadcaster's transmitter being in the same geographical location would mean that the transmitters are close enough in distance, or close enough to receive each other's signal at a predetermined signal strength that may be allow for a clear transmission. Accordingly, it would also mean that the radio broadcaster and the TV broadcaster may be able to share their feeds using a physical wire or other means of local transmission. The method of synchronization, as described in FIG. 6, may include synchronizing clocks for the radio audio packets and corresponding TV audio packets using timestamp data, and multiplexing them together once synchronized.

The architecture and headend used in the synchronization and multiplexing process may depend on the type of scenario, such as location of transmitters of the radio and TV broadcast, e.g., whether local transmission or satellite transmission can be used. Some embodiments of architectures and headend used are described further in FIG. 10-13.

The headend used may also depend on the type of application used. For example, the headend depicted in FIG. 14 may be used when IPTV, cable video, of affiliate system is used, in which satellite communication may be used to transmit broadcasts. If the application is an OTT application, then OTT system and architecture depicted in FIGS. 16 and 17 may be used. The device architecture for a receiver, whether in a separate unit or integrated within the TV, for receiving the broadcasts in any of the scenarios described above may be depicted in FIG. 15.

In some embodiments, the radio and TV broadcaster being either local or remote may be a matter of their setup. For example, in one embodiment, a manual set up process may be used to manually run a wire from the radio broadcaster's microphone to the TV broadcaster's dedicated encoder which then gets multiplexed with the TV audio and video for distribution. However, if a determination is made that, even though the two broadcasters (Radio and TV) are sitting next to each other, a raw feed of the radio broadcaster may not reach the encoders, then it may be determined that satellite communication is needed to provide the radio broadcaster's feed to the TV broadcaster's encoders. In such a case, even if the two broadcasters are next to each other, since raw feeds cannot be provided to the other using wired or terrestrial communications, they may be considered to be remote thereby needing to use satellite communications. Accordingly, it may be a manual process to either connect locally or remotely and switch between the two as needed.

At block 425, once synchronization is performed, a single multiplexed content stream, such may use MPEG-2 transport stream standard, which includes both the radio and TV broadcast may be generated. This stream may be generated at the headend, such as headend described in FIG. 12 or 13 depending on the on the type of scenario, such as location of transmitters of the radio and TV broadcast, e.g., whether local transmission or satellite transmission can be used. They may also depend on the type of application, such as OTT, IPTV, cable video, of affiliate system, which is depicted in FIG. 14.

In some embodiments, the control circuitry 220 and/or 228 may embed the generated multiplexed stream with an identifier that identifies the audio stream associated with the radio broadcast.

The PID number, which may be a unique identifier, may distinguish the radio audio stream from the TV broadcast stream both of which are multiplexed together. The unique identifier may be included in the Packet Identifier (PID) range 0x0004-0x000F, the F may indicate that it is currently reserved for future use. In other embodiments, a specific PID number, such as a prefix or a suffix, may be reserved for audio streams of radio broadcasts. Having such a designation for audio streams of radio broadcasts may allow a receiving system to recognize which packets are related to the audio stream from the radio broadcast and which are related to the TV broadcast. The multiplexed stream with the unique identifier may then be delivered to an end device, such as a user's smartphone.

At block 435, the control circuitry 220 and/or 228 may determine whether a triggering event is detected. The triggering event, in some embodiments, may be detected if a user is distracted and not consuming the TV broadcast, such as on their TV. Triggering event may also be detected if the user that has left the room or is engaged in any other activity besides consuming the TV broadcast, such as taking to another person etc. Triggering event may also include distractions in the surroundings where the TV broadcast is being played, such as external noises, people entering the room, etc.

If a triggering event is not detected, then at block 440, the control circuitry 220 and/or 228 may continue to play the TV broadcast.

In some embodiments, if a triggering event is detected, then at block 445, the control circuitry 220 and/or 228 may demultiplex the single multiplexed content stream that includes both the radio and TV broadcasts. In these embodiments, the streams may always be demultiplexed, decoded, and rendered. In some embodiments, once demultiplexed, depending on whether the triggering condition relates to rendering the radio broadcast or the TV broadcast, decoding and rendering may be performed accordingly. For example, if a determination is made based on the triggering condition that the user is distracted or has left the room and as such a radio broadcast is to be played, then the process may include demultiplexing the streams, decoding the audio associated with the radio broadcast, and rendering it/playing it for the user.

At block 450, it may select the audio stream associated with the radio broadcast based on the unique identifier and play the audio from the radio broadcast on the end device at block 455. If the end device was the same device that was previously playing the TV broadcast, then, the control circuitry 220 and/or 228 may switch from the TV broadcast to the radio broadcast. For example, the user may have been consuming TV on their end device, such as a smartphone or a tablet computer, and when the triggering condition is detected, the end device may switch and play the audio stream related to the radio broadcast. Since the process used synchronized the radio broadcast to the TV broadcast, if the user were to play the radio broadcast audio while watching the TV broadcast on another device, both broadcasts would logically correlate in-real time to what is being shown on the TV display (e.g., a play being described in the radio broadcast as currently occurring would be the same play being displayed on the TV).

FIG. 5 is a flowchart of a process for synchronizing radio broadcast with TV broadcast when both the radio and TV broadcasters are at a same location or within local transmission distance of each other, in accordance with some embodiments of the disclosure. The process 500 may be implemented, in whole or in part, by systems or devices such as those shown in FIGS. 2 and 3. One or more actions of the process 500 may be incorporated into or combined with one or more actions of any other process or embodiments described herein. The process 500 may be saved to a memory or storage (e.g., any one of those depicted in FIGS. 2 and 3) as one or more instructions or routines that may be executed by a corresponding device or system to implement the process 500.

In some embodiments, process 500, which is part of process 400 (i.e., at block 415) is a process to align and synchronize both radio and TV broadcasts when the radio and TV broadcaster's transmitters are within a distance that would allow then to share feeds via local transmission, such as via a physically connected wire between both or via terrestrial transmissions. To describe it in another manner, process 500 may be used to align and synchronize both radio and TV broadcasts when the radio and TV broadcaster's transmitters are in a same location, within a predetermined distance of each other, within local transmission range and/or at a same live event.

In this embodiment, at block 510, the raw feed of the audio of the radio broadcast is transmitted locally to a TV broadcast system, such as for example, via a wire that connects the microphone of the radio broadcaster to a dedicated encoder of the TV broadcaster.

At block 520, the TV broadcast system may receive audio stream from radio broadcast and use dedicated audio encoders to encode the received audio stream. The TV broadcast system may also encode its own audio and video feed (not shown in figure).

At block 530, the TV broadcast system may multiplex the encoded audio from radio broadcast with the encoded audio and video of the TV broadcast. Since the TV broadcaster system is aware of which segments (or data packets) of the TV broadcast correlates with the radio broadcast's segments (or data packets), it may multiplex them together such that the audio of the radio broadcast is synchronized with the audio of the TV broadcast.

Synchronization may be aimed at synchronizing the audio packets of the radio and TV broadcasts that correlate with each other. Since video packets of the TV broadcast are of different length and already synchronized with the audio packets of the TV broadcast, synchronizing audio packets of the radio broadcast with the audio packets of the TV broadcast may automatically synchronize the radio broadcast with the video of the TV broadcast.

Referring back to FIG. 4, as single multiplexed stream may be generated after the multiplexing is performed. The single multiplex stream may include synchronized radio and TV broadcasts.

FIG. 6 is an example of the radio and TV broadcasters 610 and 620 at a same location, in accordance with some embodiments of the disclosure. As depicted in FIG. 6, both the radio and TV broadcasters 610 and 620 are at the same live event 605, which in this example is a soccer game. As such, their transmitter used to transmit the live feed are also at the same live event. When both radio and TV broadcasters 610 and 620 are at the same event (or as described earlier, within local transmission range or within a range where a physical wire can be used to connect the microphone of the radio broadcaster with a dedicated encoder of the TV broadcaster), they may be able to exchange their raw broadcast feeds with each other using local transmission. Accordingly, processes and functions described at least in FIGS. 5 and 10 may be used.

FIG. 7 is a flowchart of a process 700 for synchronizing radio broadcast with TV broadcast when the radio and TV broadcasters are at different location where they cannot user local transmission to broadcast to one another, in accordance with some embodiments of the disclosure. The process 700 may be implemented, in whole or in part, by systems or devices such as those shown in FIGS. 2 and 3. One or more actions of the process 700 may be incorporated into or combined with one or more actions of any other process or embodiments described herein. The process 700 may be saved to a memory or storage (e.g., any one of those depicted in FIGS. 2 and 3) as one or more instructions or routines that may be executed by a corresponding device or system to implement the process 700.

There are many challenges to align radio and TV broadcasts that have not been attempted or accomplished by existing technologies. These challenges in part, are due to both radio and TV broadcasts operate on different frequency bands, which require separate transmission equipment and infrastructure. The propagation techniques used may also differ, such as in terms of range and interference susceptibility. These factors result in the radio broadcasts signals reaching the receiver, and the consumer, at a faster pace that the TV broadcasts. As such aligning the radio broadcast with the TV broadcast in a way that they correlate with each other, even though the audio is different, is challenging. In other words, the challenges include aligning the radio broadcast with the TV broadcast such that for a live event, when the broadcaster of the radio broadcast is describing a state of the live event, such as a particular play in a game, or a particular start of a song in a live performance, if the consumer were to watch the TV while listening to the radio broadcast, it should correlate with each other, e.g., same play described in the radio broadcast must be show in the TV broadcast. Such challenges are further extrapolated when satellite technology, which involves several components and delays are used. Such alignment is also challenging when the TV schedule includes commercial breaks and delays certain portions of the broadcast. The embodiments described in process 700 are designed to address and overcome some of these challenges to align and synchronize the radio and TV broadcasters, when their related transmitters are at different location, farther apart, and when they cannot share feeds using local transmission, e.g., a physical wire or terrestrial communications, and have to rely on satellite transmission to broadcast to one another.

In this embodiment, at block 710, an NTP server may be used to insert a common time stamp on corresponding radio audio packets and TV audio packets. Data in these packets may contextually correspond to each other. For example, if the radio broadcast is discussing a particular play in a game or a particular time of a live event, such providing commentary related to occurrence of any event at 8:05 PM in the live event, then the TV broadcast must be synchronized such that the when the radio broadcast is to be played, the TV broadcast will also be showing the same particular play or the events at 8:05 in the live event. To do so, the common clock with the exact same time stamp may be embedded in the correlating radio and TV audio packet. The NTP server that performs the time stamping or provides the time stamps to be embedded may be local or remote.

At block 720, the TV broadcaster's headend may receive audio packets associated with the radio broadcast from a first satellite and audio/video packets associated with TV broadcast from a second satellite.

Since there may be two different sources of receiving the radio and TV broadcasts, e.g. first and second satellite, and the packets related to TV broadcast which include audio/video may undergo a more complex broadcasting process (as depicted in FIG. 11), the audio data packets from the radio broadcast may arrive earlier that the audio data packets from the TV broadcast. Other reasons why radio broadcast packets may arrive faster than TV broadcast packets may be due to radio broadcasts use of higher frequency bands that allows data packets to travel faster and penetrate obstacles more easily while TV broadcasts, which use lower frequencies, may be blocked by obstacles, such as buildings, trees.

Since the radio packets arrive earlier, they may be buffered at block 730 until the corresponding audio packet from the TV broadcast with the same time stamp arrives.

At block 740, once the corresponding audio packet from the TV broadcaster with the same time arrives, both the radio broadcast and TV broadcast packets may be encoded.

Figure 13:
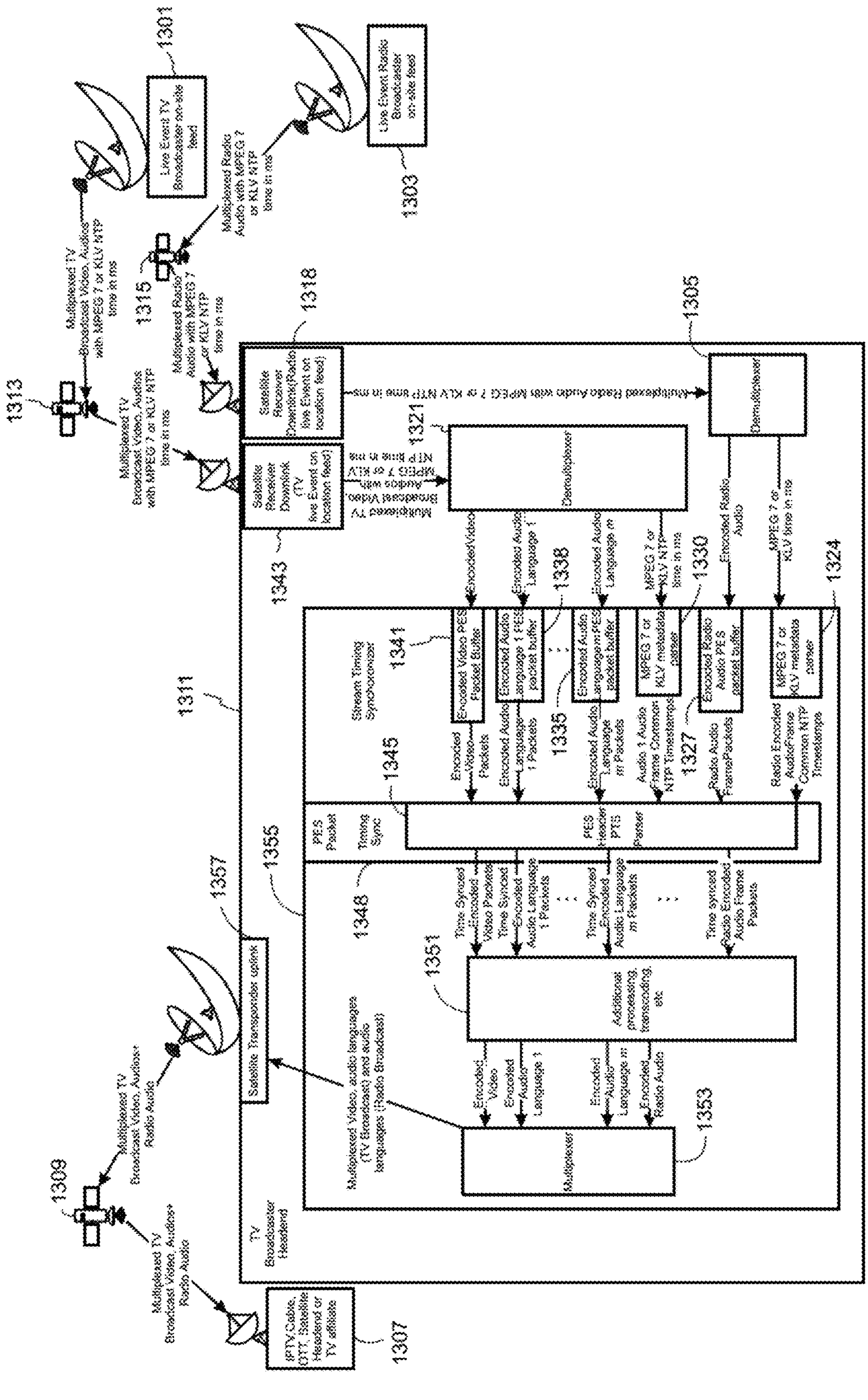
FIG. 13 depicts an architecture of a TV broadcaster system's headend when not sharing common feeds, in accordance with some embodiments of the disclosure.
Figure 14:
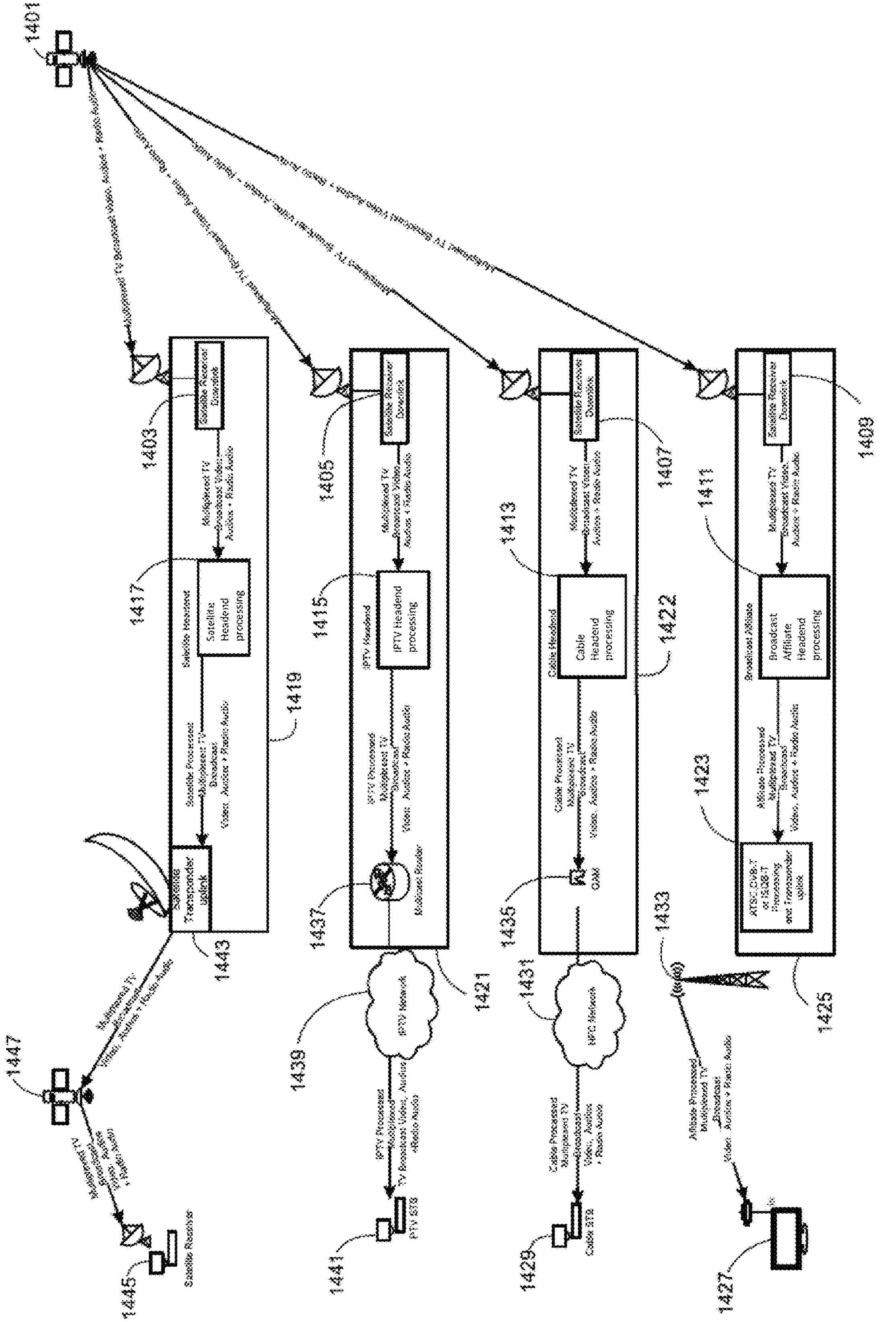
FIG. 14 depicts an architecture of an IPTV, Cable video, satellite headend, or OTA affiliate system, in accordance with some embodiments of the disclosure.

At block 750, once the corresponding audio packet from the TV broadcaster with the same time arrives and packets are encoded, the corresponding packets, the TV broadcaster's headend, such as the headend depicted in FIG. 13, may multiplex the corresponding radio and TV audio packets with the same time stamp together. The time stamp referred to in this embodiment may be the starting time of the first data packet of the radio and TV broadcasts.

The blocks 710-750 described above may the synchronization technique used in block 420 of FIG. 4 to synchronize radio and TV broadcasts, by synchronizing their audio packets, such as for example their first audio packets. The TV broadcaster's headend may then generate a single multiplexed content stream that includes both the radio and TV broadcasts where the corresponding audio packets of the radio and TV broadcast are already synchronized.

To summarize the technique used in blocks 710-750, the process of synchronization may use a common clock timestamp. For example, for the radio broadcast, the first packet for a radio audio frame may have an MPEG7 or KLV metadata packet multiplexed time synced together with the radio audio frame packet and that MPEG7 or KLV metadata packet may include the common clock timestamp. Likewise, for the TV broadcast, the first packet for a TV audio frame may have an MPEG7 or KLV metadata packet multiplexed time synced together with the TV audio frame packet and that MPEG7 or KLV metadata packet includes the common clock timestamp. Since the first packet of the audio frames for both the radio and TV broadcast have the common timestamp and that MPEG 7 or KLV metadata packet includes the common timestamp, the packets are now synchronized, e.g., the Radio and TV broadcasts are synchronized. Accordingly, since the first packet for any audio frame from either stream (radio or TV) has MPEG 7 metadata aligned with it, such metadata is used to ensure synchronization between the feeds.

Figure 8:
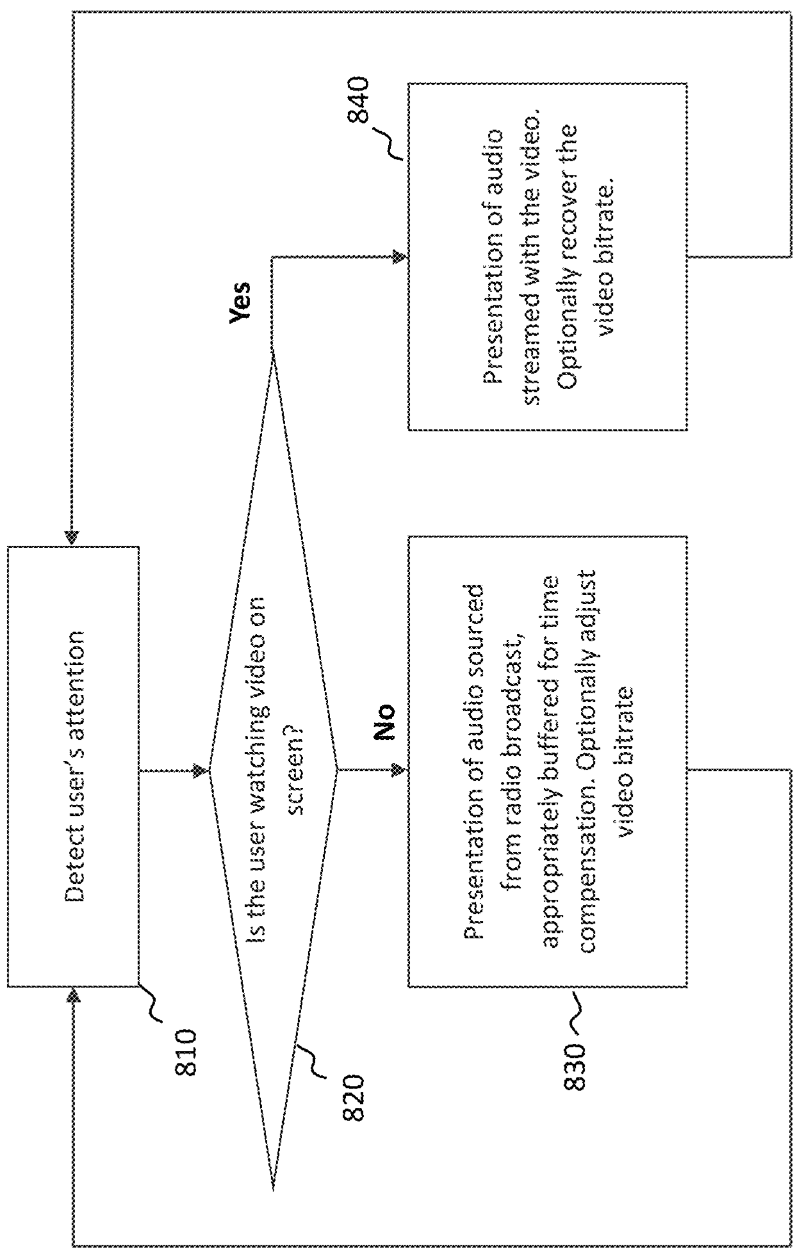
FIG. 8 is a flowchart of a process for detecting user attention and accordingly selecting the type of broadcast to play for the user, in accordance with some embodiments of the disclosure.

FIG. 8 is a flowchart of a process 800 for detecting user attention and accordingly selecting the type of broadcast to play for the user, in accordance with some embodiments of the disclosure. The process 800 may be implemented, in whole or in part, by systems or devices such as those shown in FIGS. 2 and 3. One or more actions of the process 800 may be incorporated into or combined with one or more actions of any other process or embodiments described herein. The process 800 may be saved to a memory or storage (e.g., any one of those depicted in FIGS. 2 and 3) as one or more instructions or routines that may be executed by a corresponding device or system to implement the process 800.

At block 810, a user's attention towards the TV broadcast and/or their presence in the room where the TV broadcast is displayed may be detected. Although user's attention is used as the exemplary trigger to switch from the TV broadcast to the radio broadcast, the trigger may also be any one of a user that leaving the room where the TV broadcast is displayed, user indicating to switch to radio broadcast because the user may want to consume the radio broadcast while watching TV, background noise or other people speaking interfering with the audio of the TV broadcast in the room where the TV playing the broadcast is located, new people entering the room causing distraction to a single user who was consuming the TV broadcast.

At block 820, a determination may be made whether the user is watching the video on the screen, i.e., the video from the TV broadcast which may be displayed on the TV. The determining of whether the user is watching the video on the screen may be essentially determining whether the user is distracted in any other activity other than consuming the TV broadcast.

The distraction may be detected via smart cameras and other devices in the room. For example, the smart cameras, Wi-Fi localization with a connected device worn by the user, such as a headset, may determine whether the user is watching the video on the screen. For example, the smart camera may monitor the general presence of the user, including the user's behavior and gaze. Any of the user's presence, gaze, or behavior may be analyzed to determine whether it indicates that the user is distracted and as such not watching the video on the screen. Wi-Fi localization may track the user's phone and if the user's phone is using the phone, then a detection may be made that the user is engaged in an activity using their phone and as such not watching the video on the screen. Other input may also be used to detect user distractions. For example, user speech or speech by others in the room that may be received as input at a microphone in the room may be analyzed to determine whether it relates to user engaging in some other activity that does not relate to the user watching the video on the screen.

As mentioned above, in addition to the trigger being the user's lack of attention relating to the user not watching the TV broadcast, other trigger may include the user leaving the room. Smart camera may monitor the general presence of the user and determine whether the user has left the room. Wi-Fi localization may track the user's phone and if the user's phone has left the room, it may be determined that the user has also left the room. User speech or speech by the others in the room that may be received by a microphone in the room where the TV broadcast is being played may also be analyzed to determine whether the user is leaving or has left the room.

At block 820, if a determination is made that the user is watching the video on the screen, i.e., the TV broadcast, then at block 840, the TV broadcast, which include the presentation of the audio streamed with the video may be presented. In other words, the TV broadcast may continue as is without any switching to radio broadcast. In some embodiments, if the video bitrate was changed, it may be recovered to the desired or predetermined bitrate for displaying the TV broadcast since the user is actively consuming the TV.

At block 820, if a determination is made that the user is not watching the video on the screen, i.e., the TV broadcast, or has left the room, which also relates to the user not watching the video on the screen since the user has left the room, or if the user requests to switch to a radio broadcast, then the process may move to block 830.

At block 830, the audio sourced from radio broadcast, appropriately buffered for time compensation, may be provided to a device associated with the user, such as the user's smartphone. Since the user may no longer be consuming the video, the video bitrate may be lowered. In some embodiments, bitrate may not be lowered if a determination is made that aside from the user leaving the room, there are other interested users in the same room still consuming the TV broadcast.

Figure 9:
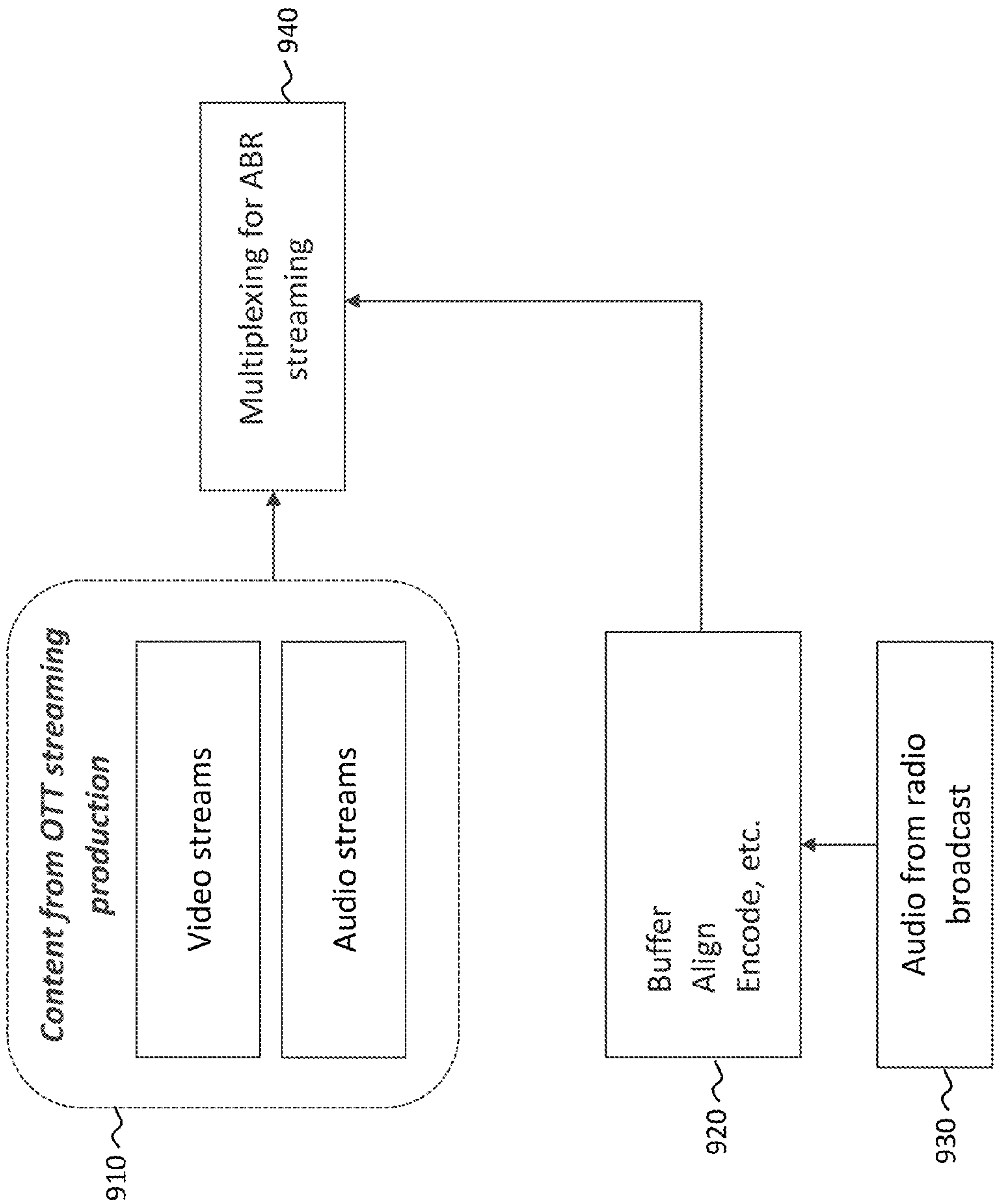
FIG. 9 is a flowchart of a process for multiplexing OTT stream with audio from a radio broadcast, in accordance with some embodiments of the disclosure.

FIG. 9 is a flowchart of a process for multiplexing OTT stream with audio from a radio broadcast, in accordance with some embodiments of the disclosure. The process 900 may be implemented, in whole or in part, by systems or devices such as those shown in FIGS. 2 and 3. One or more actions of the process 900 may be incorporated into or combined with one or more actions of any other process or embodiments described herein. The process 900 may be saved to a memory or storage (e.g., any one of those depicted in FIGS. 2 and 3) as one or more instructions or routines that may be executed by a corresponding device or system to implement the process 900.

In some embodiments, the audio from the radio broadcast at 930 may be buffered, time-aligned, and encoded at block 920. The buffered and time-aligned audio streams from the radio broadcast may then be multiplexed at block 940 with content from the OTT streams, which includes OTT's audio and video streams. The multiplexing may be performed to generate audio/video segments for ABR streaming. The operations of buffering and aligning may be content dependent. For example, different streaming content, or live sport games, may exhibit varying latencies behind the real-time or action on the field. Once the audio streams are synchronized and multiplexed, the radio broadcast may be synchronized with the TV broadcast.

Figure 10:
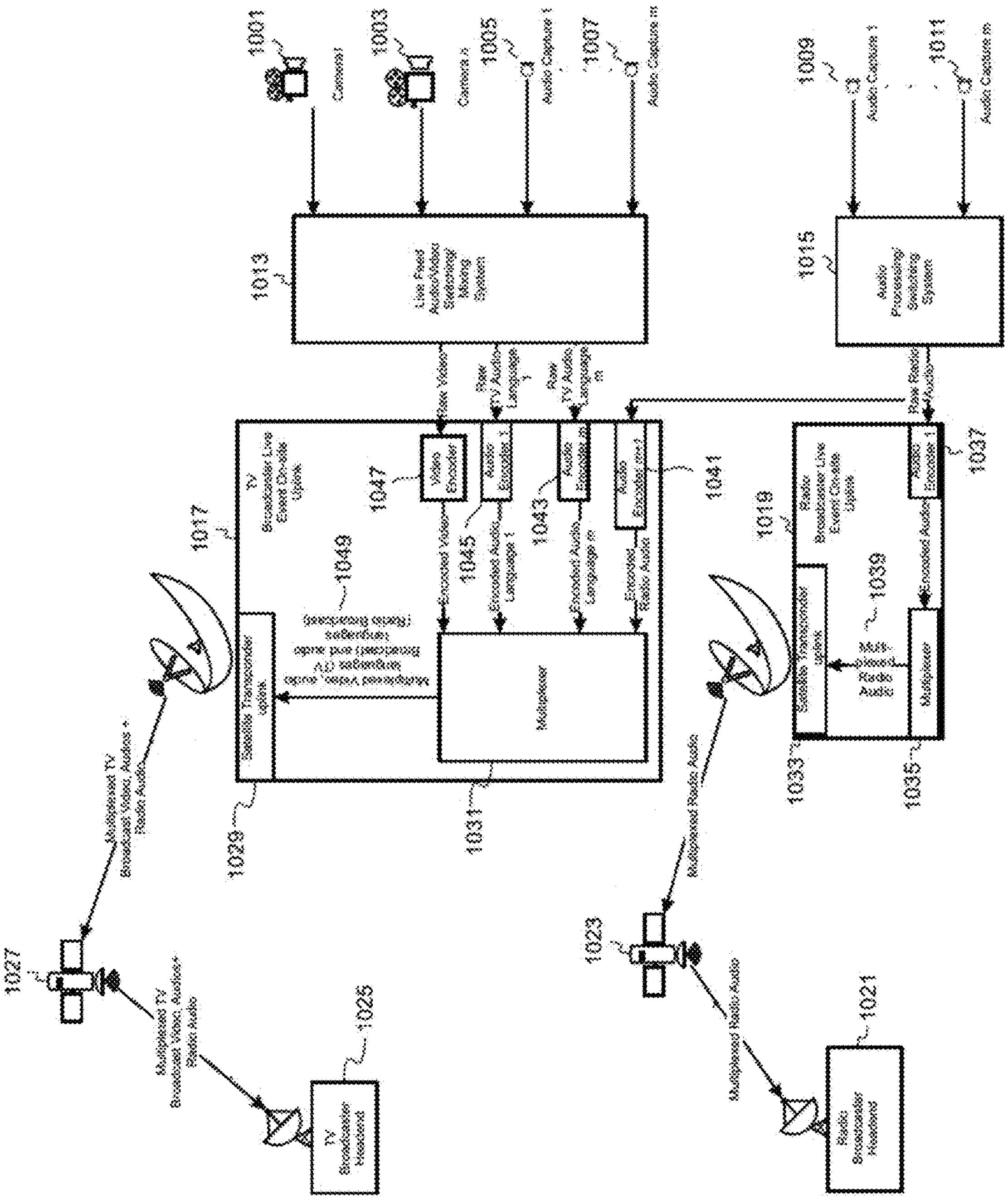
FIG. 10 depicts an architecture for synchronizing radio broadcast with TV broadcast when both the radio and TV broadcasters are at a same location or within local transmission distance of each other, in accordance with some embodiments of the disclosure.

FIG. 10 depicts an architecture for synchronizing radio broadcast with TV broadcast when both the radio and TV broadcasters are at a same location or within local transmission distance of each other, in accordance with some embodiments of the disclosure.

In this embodiment, both the radio and TV broadcasters are at the same location. Same location, as referred to herein, for synchronization purposes, involves the radio and TV broadcaster being within such a proximate distance of each other that allows them to transmit their signals directly to each other without using a satellite or within such distance of each other that they can be connected with a wire. The actual distance between the two may vary and be dependent on factors like transmitter power, frequency, and environmental conditions which determines their signal strength, i.e. how far their signal would travel to be accurately and with minimal delay get to the other broadcaster. As such, as long as they can communicate directly via a physical wire that connects them both, or via transmitting their signals locally and without a satellite, their location is considered local for synchronization.

In this embodiment, the TV broadcaster may receive audio from a radio broadcaster based on local transmission, such as via a physical wire, and multiplex it with the TV broadcast. If both broadcasters are at the event, or at the same location as described above, the audio stream from the radio broadcast may be transmitted directly to the TV broadcaster's location for encoding and multiplexing. Since local transmission is faster due to the short distance or based on the radio broadcaster being physically connected to a dedicated encoder of the TV broadcaster, it may have no delay or much lesser delay than the scenario where the radio and TV broadcasters are far apart and require satellite transmission to broadcast to each other. As such, being local and within signal reach of each other via local transmission means simplifies synchronization between the radio and TV broadcast.

In some embodiments, to distinguish the radio audio stream within the MPEG-2 transport stream broadcast, a unique identifier can be included in the Packet Identifier (PID) range 0x0004-0x000F, the F may indicate that it is currently reserved for future use. In other embodiments, a specific PID number, such as a prefix or a suffix, may be reserved for audio streams of radio broadcasts. Having such a designation for audio streams of radio broadcasts may allow the TV broadcast's headend to recognize it as such. Description of the TV broadcaster's headend and its architecture is described in further detail in FIG. 12.

Referring to the FIG. 10, in one embodiment, with respect to the TV broadcast, camera 1 (1001), camera 2 (1003), audio capture 1 (1005), audio capture m (1007) may all be located at a live event, such as a soccer game. The input from all these cameras and audio capture devices may be obtained by mixing system 1013.

The mixing system may then transmit the obtained feeds from the cameras and audio capture devices to video and audio encoders associated with the TV broadcaster system 1017. For example, a raw video feed may be transmitted to a video encoder 1047, a raw TV audio language 1 feed may be transmitted to audio encoder 1045, a raw TV audio language m feed may be transmitted to audio encoder m 1043. These cameras and audio capture feeds may be from different angles of the field and capture different commentary or different languages of commentary from the field associated with the gameplay.

The video and audio encoders may then encode their respective feeds and transmit it to the multiplexer 1019 at the TV broadcaster 1017.

Similarly, with respect to the radio broadcast, audio captures 1009 and 1011, that relate to commentary associated with the gameplay in the live event, may be captured. The captured audio feeds may be processed by the audio processing and switching system 1015. The audio processing and switching system 1015 may then transmit the raw audio related to the radio broadcast to the audio encoder 1037 that is part of the radio broadcaster system 1019. After encoding the raw audio, the audio encoder may transmit the audio stream to an audio encoder m+1 (1041) at the TV broadcaster system 1017.

At the TV broadcaster system 1017, both encoded audio stream related to the radio broadcast received from the audio encoder 1041 and the audio/video related to the TV broadcast received from audio and video encoders 1047, 1045, 1043 may all be provided to the multiplexer 1031.

Figure 12:
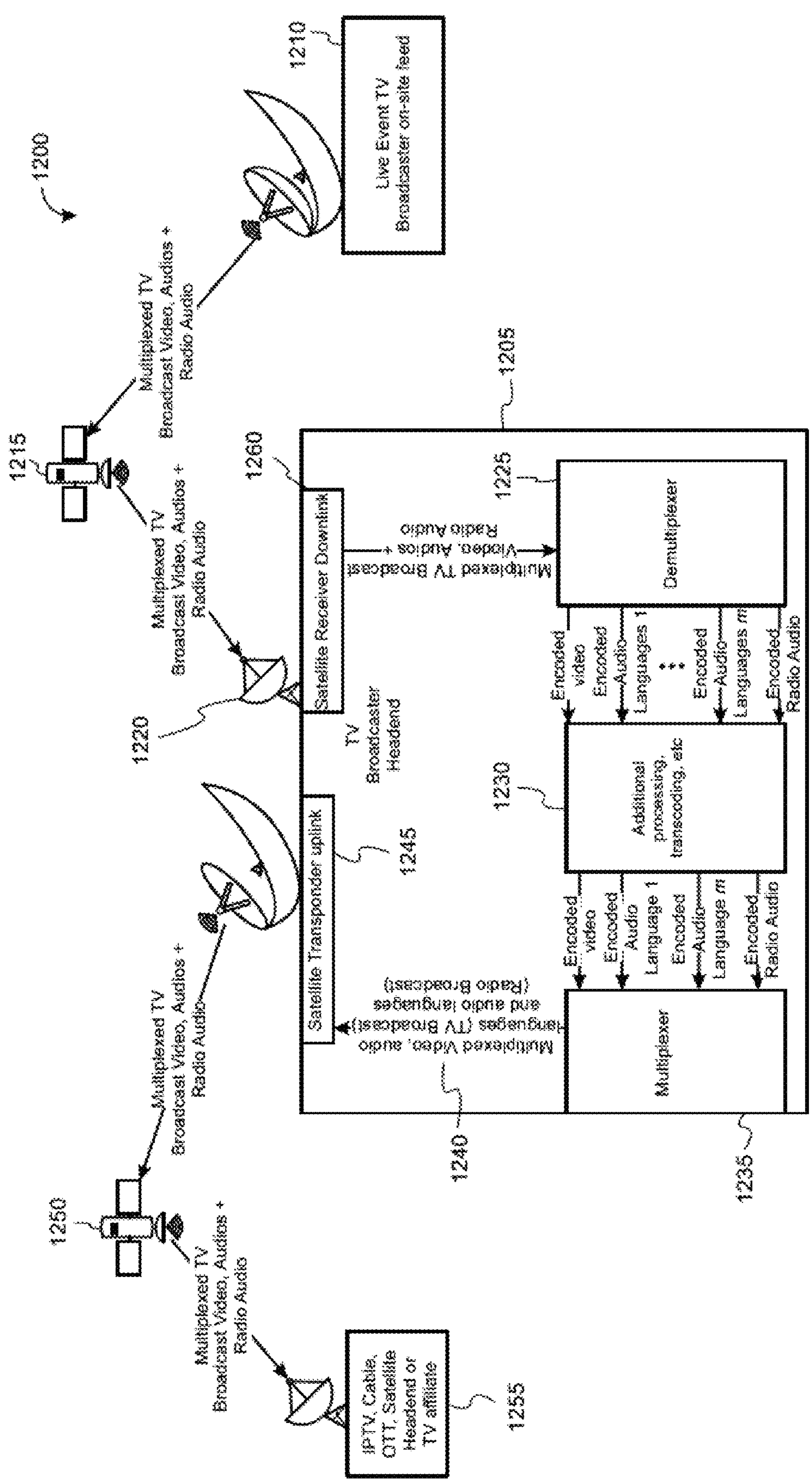
FIG. 12 depicts an architecture of a TV broadcaster system's headend for sharing common feeds, in accordance with some embodiments of the disclosure.

The multiplexer 1031*may* then multiplex the audio stream related to the radio broadcast with the audio stream related to the TV broadcast. The multiplexed stream, which is a single stream, may then be transported at 1049 to the satellite transponder uplink 1029. From the satellite transponder uplink 1029, it may then be transmitted to the satellite 107, which may then further transmit it to their TV broadcaster's headend 1025 (as depicted in FIG. 12).

At this stage, the audio packets related to the radio broadcast may correspond to the audio/video packets associated with the TV broadcast. As such, when it's time to switch from the TV broadcast to the radio broadcast, such as based on the triggering condition, a consumer may consume the audio stream associated with the radio broadcast while watching the corresponding TV broadcast and they would be synchronized.

FIG. 11 depicts an architecture for synchronizing radio broadcast with TV broadcast when the radio and TV broadcasters are at different location where they cannot user local transmission to broadcast to one another, in accordance with some embodiments of the disclosure. In this embodiment of FIG. 11, the radio and TV broadcasters are located farther apart where satellite communication is to be used to transmit each other's broadcast to the other. In other words, they are located beyond the local transmission range in which signals can be transmitted locally without need for a satellite or beyond a certain distance where connecting the radio and TV broadcaster with a physical wire may become impractical.

In this embodiment, the clocks of the radio and TV broadcasters are synchronized using a common clock via (Network Time Protocol) NTP protocol. A local NTP server, or a remote NTP server over the internet, may be used for performing the synchronization.

The synchronization performed in this embodiment is the synchronizing of audio data packets of the TV broadcast with audio data packets of the radio broadcast. Since the audio and video data packets of the TV broadcast are already synchronized with each other, and video frames are of different length of time than audio frames, synchronizing the audio frames of radio and TV broadcast together has the effect of synchronizing the radio broadcast with the video of the TV broadcast.

The synchronization between the audio feeds of the radio and TV broadcasts doesn't have to be within milliseconds since there is no lip sync issue. In other words, since the commentary on the radio although related to the display is not lip synched with the display, such as in a movie, a synchronization between the audio feeds of the radio and TV broadcasts may have a small gap and still be unnoticeable. As such, in some embodiments, it may be preferred that the clocks are within 1000-1500 ms, which would still result in the user experience having minimal impact. The time stamps from the common clock time which is the same time stamped on both audio packet of the radio broadcast and the corresponding audio packet of the TV broadcast, is then sent to an MPEG-7 or KLV metadata generator.

When the multiplexer in the TV broadcaster's system begins to multiplex the first packet of the first audio stream's frame, the multiplexer may also multiplex the MPEG-7 or KLV metadata into the multiplexed stream. The timestamps in the multiplexed stream for the metadata and first packet of an audio frame may match in the multiplexed MPEG-2 transport stream.

The same may apply to the radio broadcaster's multiplexed stream. When the multiplexer multiplexes the first audio packet for an audio frame in the radio broadcast stream, the multiplexer may also multiplex the MPEG-7 or KLV metadata into the multiplexed stream.

The time stamps in the multiplexed stream for the metadata and first packet of an audio frame may match in the MPEG-2 audio stream. As described earlier, the audio of the radio broadcast may be embedded with a unique PID number that identifies it as an audio stream from the radio broadcast. For example, a PID number such as 0x0004-0x000F may be reserved as the specific PID number for the radio audio, the same may be done for identifying the MPEG-7 or KLV metadata stream within the transport stream.

As depicted in FIG. 11, the TV broadcaster may use equipment 1101-1107 which includes cameras and audio equipment. Such cameras and audio equipment may capture video and audio of a live event and then be provided to a mixing system 1115. The mixing system 1115 may further process the raw feed (video and audio of the live event captured) and transmit it to a TV broadcaster's live event on-site uplink 1151. The TV broadcaster's live event onsite uplink 1151, which may include video and audio encoders 1143-1149, may take the raw video and raw audio and encode it prior to providing it to the multiplexer 1161 of the TV broadcaster's live event on-site uplink 1151.

Similarly, at the radio broadcaster's end, the radio broadcaster may use devices 1119 and 1121 to capture audio from the radio broadcasters related to the live event. The raw audio captured may then be processed by switching system 1117. The raw audio may then be provided to an audio encoder 1133 at the radio broadcaster's live event onsite uplink 1137.

In some embodiments, an NTP server 1109 or a remote server 1111 which may be connected via the Internet, may synchronize the clocks for the radio broadcaster and the TV broadcaster. The NTP server 1109 or a remote server 1111 may then transmit the time stamps associated with the synchronized clock to the MPEG 7 or KLV metadata generators, such as the MPEG 7 or KLV metadata generator 1141 associated with the TV broadcast and the MPEG 7 or KLV metadata generator 1126 associated with the radio broadcast. The respective MPEG 7 or KLV metadata generators 1139 and 1141, using the synchronized clock data from the NTP server 1109 or a remote server 1111 may generate a timestamp for the audio data packets for the radio and TV broadcasts. The timestamp generated may be the exact same time for the starting of a first audio data packet for the radio broadcast and a corresponding audio data packet for the TV broadcast.

Each MPEG 7 or KLV metadata generator 1139 and 1141 may send the timestamp data to their respective multiplexers 1135 and 1161.

The multiplexer 1135 for the radio broadcast may multiplex the timestamp provided by the MPEG 7 or KLV metadata generator 1139 with the radio broadcast's encoded audio that was encoded by encoder 1133. Likewise, the multiplexer 1161 for the TV broadcast may multiplex the timestamp provided by the MPEG 7 or KLV metadata generator 1141 with the TV broadcast's encoded audio and video that was encoded by encoder 1143-1149.

The multiplexed audio packet for the radio broadcast with the timestamp may then be transmitted to the TV broadcaster's headend 1155 via satellite transponder uplink via satellite 1159. Further detail relating to the TV broadcaster's headend 1155 is described in FIG. 13. Likewise, the multiplexed audio and video packets for the TV broadcast (which may be in a container 1131) with the timestamp may then be transmitted to the TV broadcaster's headend 1155 via satellite transponder uplink and satellite 1153. As depicted, the TV broadcast's container 1131 may include MPEG 7 or KLV metadata timestamps 1123, audio n frames 1125, audio 1 frames 1127, and video frames 1129.

At the TV broadcaster's headend 1155 (e.g., FIG. 13), since the audio packets from the radio broadcast received from satellite 1159 may arrive earlier than the audio/video packets from the TV broadcast received from satellite 110, they may be placed in a buffer until the corresponding audio packet from the TV broadcaster is received. The audio packet from the radio broadcast may then be buffered until an audio packet from the TV broadcast with the same timestamp as the audio packet from the radio broadcast is received. Once received, the synchronization process may be completed and both the synchronized audio packets from the radio and TV broadcast (and the video packet from the TV broadcast) may be sent to the client device for switching when the triggering condition is detected.

FIG. 12 depicts an architecture of a TV broadcaster system's headend for sharing common feeds, in accordance with some embodiments of the disclosure. In some embodiments, the architecture depicted in FIG. 12 for the TV broadcaster system's headend is used when the radio and TV broadcasters are located close enough to transmit signals directly to each other without using a satellite, such as via a physical wire them connects them or via terrestrial communications. As described earlier, with respect to the physical wire, this distance depends on whether the distance is close enough, such as 25-100 feet, which makes wired connection practical. With respect to terrestrial communications, factors like transmitter power, frequency, and environmental conditions. As long as they can communicate directly using local transmission and share common feeds, their location is considered local for synchronization.

In some embodiments, the architecture depicted in FIG. 12 includes TV broadcaster's equipment to capture onsite feeds 1210, a TV broadcaster headend 1205 which includes a demultiplexer 1225, additional processing unit 1230, multiplexer 1235, a satellite receiving downlink 1260 associated with the TV broadcaster head in, and a satellite transponder uplink 1240 associated with the TV broadcaster head in, an IPTV cable OTT, satellite hidden or TV affiliate 1255 all of which communicate through satellites 1250 and 1215.

In this embodiment, the TV broadcaster's equipment 1210, such as a camera or audio equipment, captures on-site feed from the live event. In this embodiment, the radio broadcaster's direct source audio at the live event is encoded into the radio broadcaster's audio encoder for delivery to the radio broadcaster's headend and the same source feeding the audio encoder at the live event is also feeding an audio encoder for the TV broadcaster. This headend is used for the process described in FIG. 10.

The multiplexed TV broadcast with the audio broadcast is transmitted from the live event via satellite 1215 to the satellite receiver downlink 1220 that may then be provided to the TV broadcaster headend 1205. The TV broadcaster headend 1205 may then then use a demultiplexer 1225 to demultiplex the received multiplex stream that includes both the TV broadcast and the radio broadcast. The demultiplexing may involve separating the TV broadcast from the radio broadcast.

After the TV broadcast from the radio broadcast are demultiplexed from each other, the encoded audio and video associated with TV broadcast and the audio associated with the radio broadcast may be provided to the additional processing module 1230. At this stage, the additional processing module 1230 may perform any additional processing, such as transcoding, etc., as needed. For example, the additional processing may be transcoding to a different bitrate for delivery to the IPTV, Cable, OTT headend or TV network affiliates. The data inserted into 0x0004-0x000F for radio audio or specific PID number will be carried all the way to the Cable HFC, IPTV, Satellite/TV Affiliate's headend and on to the client device.

The additional processing module 1230 may then provide the encoded audio and video associated with TV broadcast and the audio associated with the radio broadcast to multiplexer 1235 for multiplexing. At this stage, the multiplexer 1230 may multiplex the encoded audio and video associated with TV broadcast and the audio associated with the radio broadcast such that the audio of the TV broadcast and the audio of the radio broadcast are synchronized.

At 1240, the synchronized and multiplexed stream may be provided to IPTV, Cable, OTT headend or TV network affiliates by using satellite transponder uplink 1240, satellite 1250, and headend 1255 and then provide to the client device in an MPEG-2 transport stream format. The client device receiving the MPEG-2 transport stream, detecting that a radio broadcast PID is present in the stream, may enable the client device's ability to switch to the radio feed when a triggering event, such as user's focus in not on the TV monitor or not in the room, is detected.

FIG. 13 depicts an architecture of a TV broadcaster system's headend when not sharing common feeds, in accordance with some embodiments of the disclosure. In some embodiments, the architecture depicted in FIG. 13 for the TV broadcaster system's headend is used when the radio and TV broadcasters are at different location where they cannot user local transmission to broadcast to one another, i.e., they are not physically connected by a wire or are beyond the local transmission range due to being located farther apart and as such may have to use satellite communication transmit each other's broadcast to the other.

In this embodiment, the TV broadcaster's headend 1311 may receive data feeds from the two sources that must be synchronized and multiplexed together using a common timestamp. The two feeds may include a radio broadcaster's feed relating to the live event, e.g., the radio broadcaster's commentary for a live game, including a specific play currently occurring in the live game and a TV broadcaster's feed from relating to the live event, e.g., the TV broadcaster's video and audio for the same live game, including a specific play currently occurring in the live game. As described earlier, the satellites may be used since the radio and TV broadcasters may be outside the local transmission range of each other or farther apart where connecting them with a wire is not practical. Since there may be separate transmission methods and satellites involved, the radio feed may be received faster than the TV feed at the TV broadcaster's headend 1311.

The TV broadcaster's headend 1311 in this embodiment, may use a clock synchronization method to synchronize the two different feeds received from two different satellites. To synchronize the radio broadcast with the TV broadcast, the TV broadcaster's headend 1311 may synchronize audio data packets from the radio broadcast with audio data packets from the TV broadcast. Since the audio and video data packets within a TV broadcast are already synchronized, aligning the radio's audio with the TV's audio effectively may synchronize the entire radio broadcast with the TV broadcast (i.e., including the TV's video). Once the two audio streams are received with matching packet timestamps, the radio audio stream and TV audio and video streams may be sent to the MPEG-2 transport stream multiplexer to be multiplexed together.

In some embodiments, the synchronization performed (i.e. of radio/TV audio packets) may not need to be within milliseconds of each other since the commentary on the radio is not expected to match the on-screen visuals in a lip-synced manner. As a result, a slight delay between the audio feeds may not be noticeable to viewers. As such, in some embodiments, it may be preferred that the clocks are within 1000-1500 milliseconds (ms), which would still result in the user experience having minimal impact. The time stamps from the common clock time which is the same time stamped on both audio packet of the radio broadcast and the corresponding audio packet of the TV broadcast, is then sent to an MPEG 7 or KLV metadata generator. Using this time stamping technique, the timestamps are handled in a manner that result in achieving much closer synchronization that 1000-1500 ms.

The process used by the TV broadcaster's headend 1311 may include receiving the two streams (i.e. radio broadcast stream and TV broadcast stream) via satellite receivers 1318 and 1343 and then de-multiplexing the received streams using de-multiplexer 1305 and 1321. The received stream may include a common timestamp in milliseconds (ms) generate by an NTP server using a NTP synchronized clock. The broadcaster's streams may then be encoded, and video and audio PES streams may be sent to a stream timing synchronizer 1355 where the PES packets may be stored into a PES packet buffer.

The demultiplexed MPEG 7 or KLV NTP time metadata may then be sent to the stream timing synchronizer's MPEG 7 or KLV metadata parser 1324 and/or 1330. The incoming radio live event feed may be received and demultiplexed. The audio PES packets may be stored in an encoded radio audio PES packet buffer 1327.

The PES Header and PTS parser 1345 may then read the PTS from the PES headers and compare the common time stamp of the first packet in an audio frame from the TV broadcaster's first audio stream to the first packet in the radio's audio frame. When a common time stamp has arrived for both streams, the video PES packets for the corresponding video frames are read and removed from the Encoded PES video buffer and sent to a system to perform additional processing like content filtering, transcoding, etc. AS described earlier the packet of the radio broadcast with the same time stamp as the packet from the TV broadcast may contextually correlate with each other. In other words, if the radio broadcast is describing a particular play in the game the TV broadcast may be synchronized to show the same particular play. The same method may be applied for all the encoded audio language buffers 1338 and for the encoded radio audio buffer 1327.

The additional processing may cover items such as content filtering for TV rating, transcoding for distribution to service providers, etc. The processed/transcoded TV broadcaster's video and audio streams along with the time synchronized radio broadcaster's audio stream may then be sent to the multiplexer 1353. The multiplexed TV broadcast video, audios+radio audio stream may then be distributed over the satellite 1309 or fiber link to IPTV, Cable, OTT headend 1307 and also possibly to OTA TV affiliates.

FIG. 14 depicts an architecture of an IPTV, Cable video, satellite headend, or OTA affiliate system, in accordance with some embodiments of the disclosure.

In some embodiments, different headend are displayed in FIG. 14. For example, a satellite headend is depicted at 1419, an IPTV headend is depicted at 1421, a cable headend is depicted at 1422, and a broadcast affiliate headend is depicted at 1425. Each headend may include a processing, demultiplexing, transcoding, and multiplexing unit, such as those depicted at 1424, 1434, 1444, and 1454.

In some embodiments, the satellite headend 1419 may communicate with a satellite receiver 1445 via QAM/satellite transponder uplink 1443 and satellite 1447. Likewise, in some embodiments, the IPTV headend 1430 may communicate with an IPTV STB receiver 1441 by using a multicast router 1437 and by connecting via an IPTV network 1439. In another embodiment, the cable headend 1440 may communicate with a cable STB receiver 1429 via QAM 1435 and HFC network 1431 and the broadcast affiliate headend 1425 may communicate with a TV receiver 1427 via ATSC, DVB-T or ISDB-T processing and transponder uplink and broadcast tower 1433.

In some embodiments, all incoming broadcast feeds, such as radio broadcaster's feed or TV broadcaster's feed, may be received via satellite 1401 at respective headends 1419, 1421, 1422, and 1425, such as via respective downlinks 1403, 1405, 1407, and 1409. The incoming broadcast feeds received via the satellite 1401 may contain the original broadcaster's encoded video, audios and time adjusted radio audio.

Once received at the respective headend 1419, 1421, 1422, and 1425, the respective processing, demultiplexing, transcoding, and multiplexing units 1411, 1413, 1415, and 1417 may process the received feed by performing processing tasks such as video and/or audio transcoding, rate shaping, and other necessary functions.

Transcoding performed by the multiplexing units 1411, 1413, 1415, and 1417, to ensure that the broadcast content received can be played in the format compatible for the end device to which it is transmitted. It may also be used to adjust quality of the broadcast. It may further be used to perform bitrate adjustments for delivery to the IPTV, Cable, OTT headend or TV network affiliates. Rate Shaping performed by the processing, demultiplexing, transcoding, and multiplexing units 1411, 1413, 1415, and 1417 may involve adjusting the bit rate of the video and/or audio signal to match the available bandwidth or transmission capacity. Such bit rate adjustment may be helpful in avoiding or minimizing buffering issues that may be caused due to latency or limited bandwidth. In some embodiments, if a determination is made that the bandwidth or transmission capacity is less than that required at the current bitrate of the received feed, then processing, demultiplexing, transcoding, and multiplexing units 1411, 1413, 1415, and 1417 may reduce the bitrate to match the capacity. Likewise, if the bitrate it lower than the bandwidth capacity, it may be increased to improve quality of the audio and/or video. Although transcoding and rate shaping are described, the processing, demultiplexing, transcoding, and multiplexing units 1411, 1413, 1415, and 1417 may perform any other type of processing to get the broadcast feed in a form and shape that can be played by the end device.

Once processing, demultiplexing, transcoding, and multiplexing units 1411, 1413, 1415, and 1417 perform the operations, the processed feed, which relates to a live event, such as a game, may be sent to via Satellite, IPTV/DSL, Cable HFC or OTA (ATSC, DVB-T or ISDB T) broadcast to a respective tuner, such as an OTA TV tuner, associated with an end device on which the broadcast will be played. In some embodiments, in each of these cases, the incoming unique specific PIDs number or the data inserted into 0x0004-0x000F for radio audio will be carried through to the client devices if the streams are re-multiplexed in the headend or OTA affiliate processing.

Figure 15:
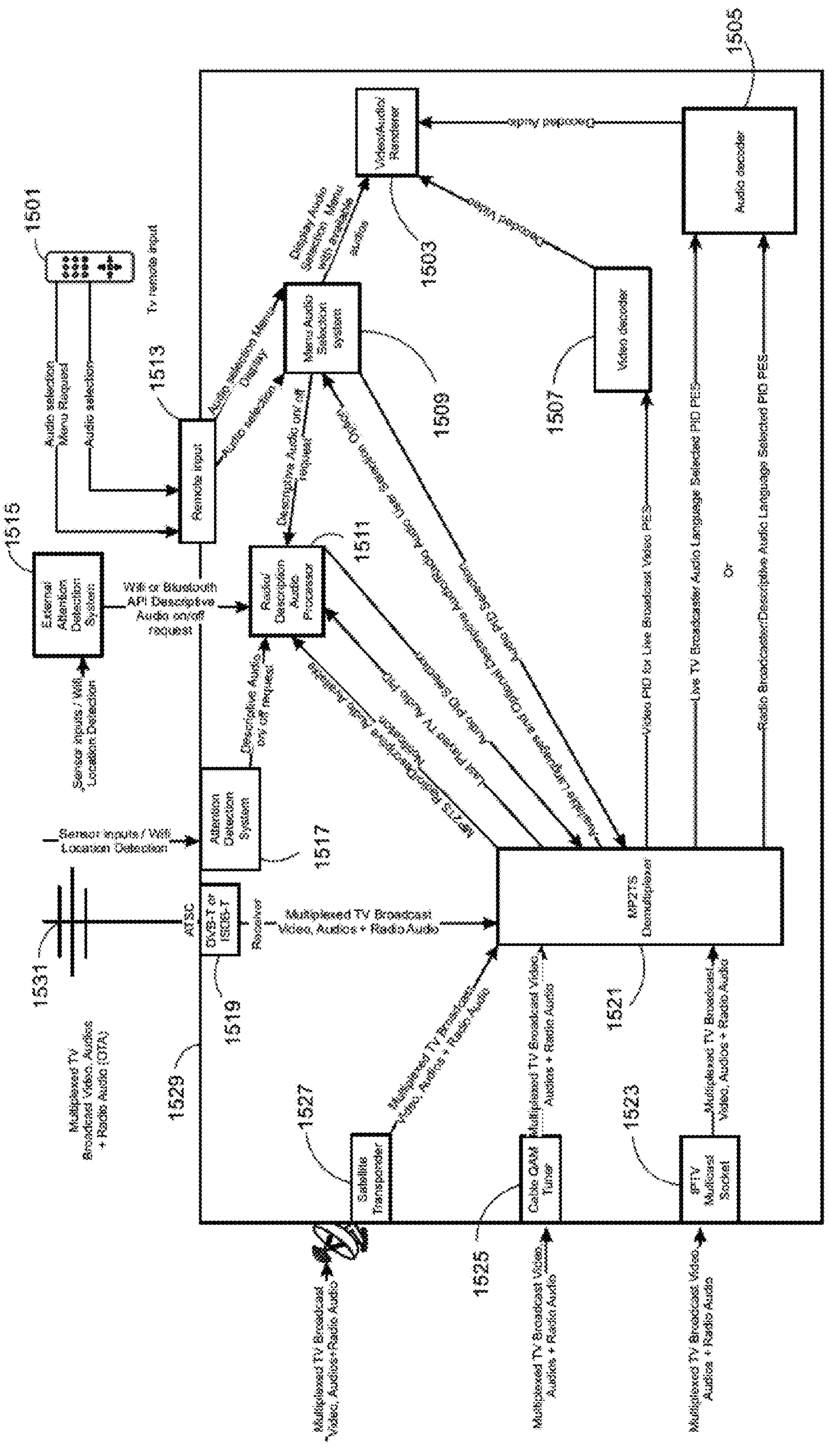
FIG. 15 depicts an architecture of an IPTV, cable video, satellite, and OTA device, in accordance with some embodiments of the disclosure.

FIG. 15 depicts an architecture of an IPTV, cable video, satellite, and OTA device, in accordance with some embodiments of the disclosure. In some embodiments, device architecture for 1) OTA ATSC, ATSC, DVB-T or ISDB-T receiver in a separate box or in a TV, 2) Satellite receiver in a satellite box, 3) Cable QAM tuner in a Cable STB or cable card TV, and 4) An IPTV set top box which leaves and joins multicast addresses assigned to live TV services is depicted.

In some embodiments, a multicast feed is received by different types of transponders, tuners, sockets, and receivers. The received multicast feed contains the live broadcast video and audio as well as the time synced radio broadcast audio. For example, the multicast feed received for IPTV is received by an IPTV multicast socket 1523, a cable is received by a cable QAM tuner 1525, a satellite is received by a satellite transponder 1527, and a DVB-T or ISDB-T is received by a receiver 1519. In these embodiments, the main difference is how the multicast live feed is received.

Once received, in all cases, the multicast feed is passed to the MPEG-2 transport stream (MP2TS) demultiplexer 1521. The MP2TS demultiplexer may receive the feed and process the MP2TS packet identifiers (PIDS). There may be a unique PID for the video, all live TV broadcast audios as well as any metadata streams that are multiplexed into the MP2TS.

The demultiplexer may also process the PID to determine if the PID includes descriptive an audio stream associated with a radio broadcast. As described earlier, the MP2TS specification may be modified to leverage the PID 0x0004-0x000F for identification of audio stream associated with the radio broadcast or there may be a specific PID number that is carried from the broadcast live event all the way to the multicast sent directly to the client device.

The demultiplexer may determine which stream, in the multiplexed stream (which may be a combined radio and TV broadcast stream), is related to audio of the radio broadcast, based on its unique PID number. Once identified, the audio stream associated with the radio broadcast may be separated from the audio and video streams associated with the TV broadcast.

The MP2TS demultiplexer may then send a notification to an audio selection system 1509 on the device of all audios included in the received live stream. These audios may include several languages and now may include the descriptive radio broadcast allowing a menu selection system to also include any audio associated with the radio broadcast for selection by the device or the user.

A radio descriptive audio processor 1511 may be used for receiving the notification if the live event multicast also includes a radio/descriptive audio stream along with the PID of the stream. The radio descriptive audio processor 1511 may also receive the last TV broadcast audio PID that was selected. This may allow the radio descriptive audio processor 1511 to automatically switch back to the previous live broadcast audio PID from a radio/descriptive audio stream.

An attention detection system 1515 or 1517 may be included to detect when a triggering condition is satisfied, e.g., when the user is not watching the screen or has left the room. As described earlier, several methods may be used to detect whether the triggering condition has been satisfied, e.g., the user is distracted, not paying attention to watching the TV broadcast, or has left the room. For example, the detection methods may include use of smart cameras, microphones, or Wi-Fi localization and tracking techniques. In one embodiment, a recording system may leverage Wi-Fi localization of a user using the user's personal wearable connected device or phone. For example, of the Wi-Fi indicates moving away of the signal from the room or indicates that the user is connected via Wi-Fi to another application which is not the display of the TV broadcast, then a determination may be made that the user is distracted and/or left the room.

In some embodiments, smart cameras may be used to detect a triggering condition, which may be detection of a distracted user, user leaving the room, on any activity performed by the user that is not engaged in consumption of the TV broadcast displayed on the display, such as a TV. To detect the occurrence of the triggering condition, the smart cameras may detect the presence of the user in the room and also detect the user's gaze to determine if it is directed to the TV set where the TV broadcast is displayed. The Attention Detection System 1515 may also be on an external device but may provide the ability for notification via Bluetooth or Wi-Fi APIs.

The client device may include its own sensors for determining the triggering condition. It may also use APIs for receiving other smart sensor data relating to the occurrence of the triggering condition. The Attention Detection System 1517 may send a notification if it determines that the triggering condition has occurred. The notification may be sent to the radio descriptive audio processor 1511 to enable/turn on the descriptive audio which may cause the radio descriptive audio processor 1511 to request the PID identified by the 0x0004-0x000F or dedicated PID number to the MP2TS demultiplexer 1521. The MP2TS demultiplexer may then switch to sending the radio broadcast's live audio PID PES to the audio decoder 1505.

If a determination is made that the triggering condition has not occurred, e.g., the user is determined to be watching the TV broadcast, then the radio descriptive audio processor 1511 may request the MP2TS demultiplexer 1521 to switch to sending the TV broadcast's live audio PID PES to the audio decoder 1505. If a determination is made that the triggering condition has occurred, e.g., the user is distracted or left the room, then a switch may be made to the live radio broadcast. In some instances, the user may manually select listening to the radio broadcast and as such the radio broadcast may be played without switching back and forth to the TV broadcast based on changes in the occurrence and non-occurrence of the triggering condition.

Figure 16:
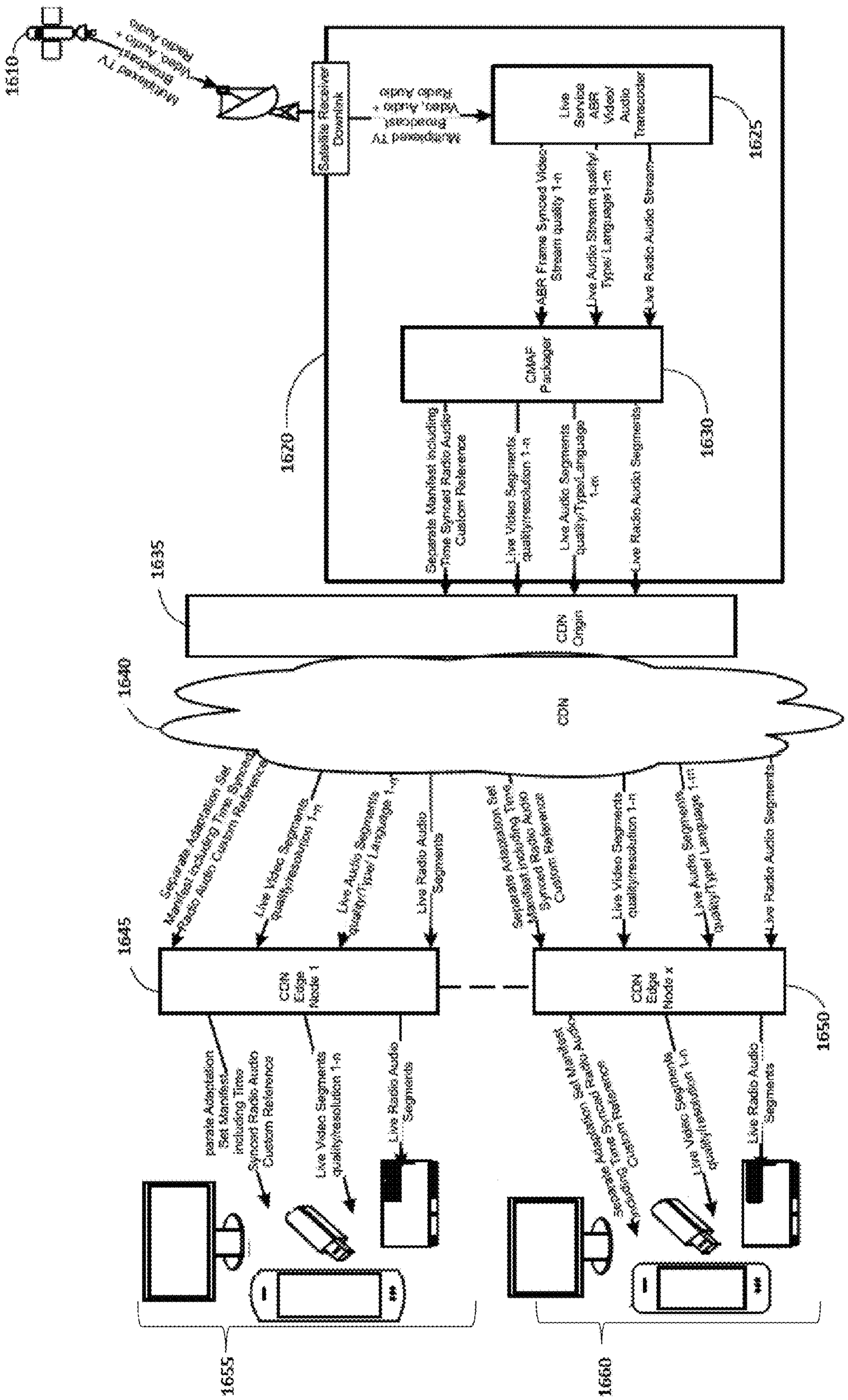
FIG. 16 depicts an architecture of an OTT live service provider system, in accordance with some embodiments of the disclosure.

FIG. 16 depicts an architecture of an OTT live service provider system, in accordance with some embodiments of the disclosure. In this embodiment, at OTT headend 1620 may receive a multiplexed stream that includes both radio and TV broadcast from satellite 1610. When the OTT headend 1620 receives the multiplexed stream, which is a multicast MP2TS feed, in one embodiment, the OTT headend uses its ABR transcoder's demultiplexer to recognize the data address inserted into 0x0004-0x000F as the audio associated with the radio broadcast. In another embodiment, the OTT headend uses its ABR transcoder's demultiplexer to recognize the audio associated with the radio broadcast based on its specific PID that may have been reserved for descriptive audio. As such the ABR transcoder's demultiplexer may either use the data address 0x0004-0x000F or the specific PID, one or the other, to recognize the audio as associated with the radio broadcast. In some embodiments, the OTT headend's ABR transcoder's demultiplexer make look for the specific PID number as it processes the multiplexed stream. If the demultiplexer detects the PID that is designated for the audio associated with the radio broadcast, then the ABR transcoder 1625 may pass through or transcode the audio associated with the radio broadcast and then send it to the ABR packager 1630. The ABR packager 1630 may receive the audio associated with the radio broadcast and generate a specific adaptation with an identifier set for the radio audio in the manifest. One example of such an adaptation set is provided in FIGS. 18A-C. This separate adaptation set with a unique identifier in the manifest may be used as an indicator by the OTT device with the switching capability to determine that the multiplexed stream (e.g., the live media stream) includes audio associated with the radio broadcast to enable trigger based switching. The components used in the process described in FIG. 16 may include the OTT headend 1620 with a live service ABR video/audio transcoder 1625 and a CMAF packager 1630. The process may also utilize content delivery network (CDN) origin and CDN to precache the video, audio and radio audio segments to edge nodes 1 through n (1645, 1650) for availability of the radio audio and TV video and audio broadcasts to the end devices 1655 and 1660.

Figure 17:
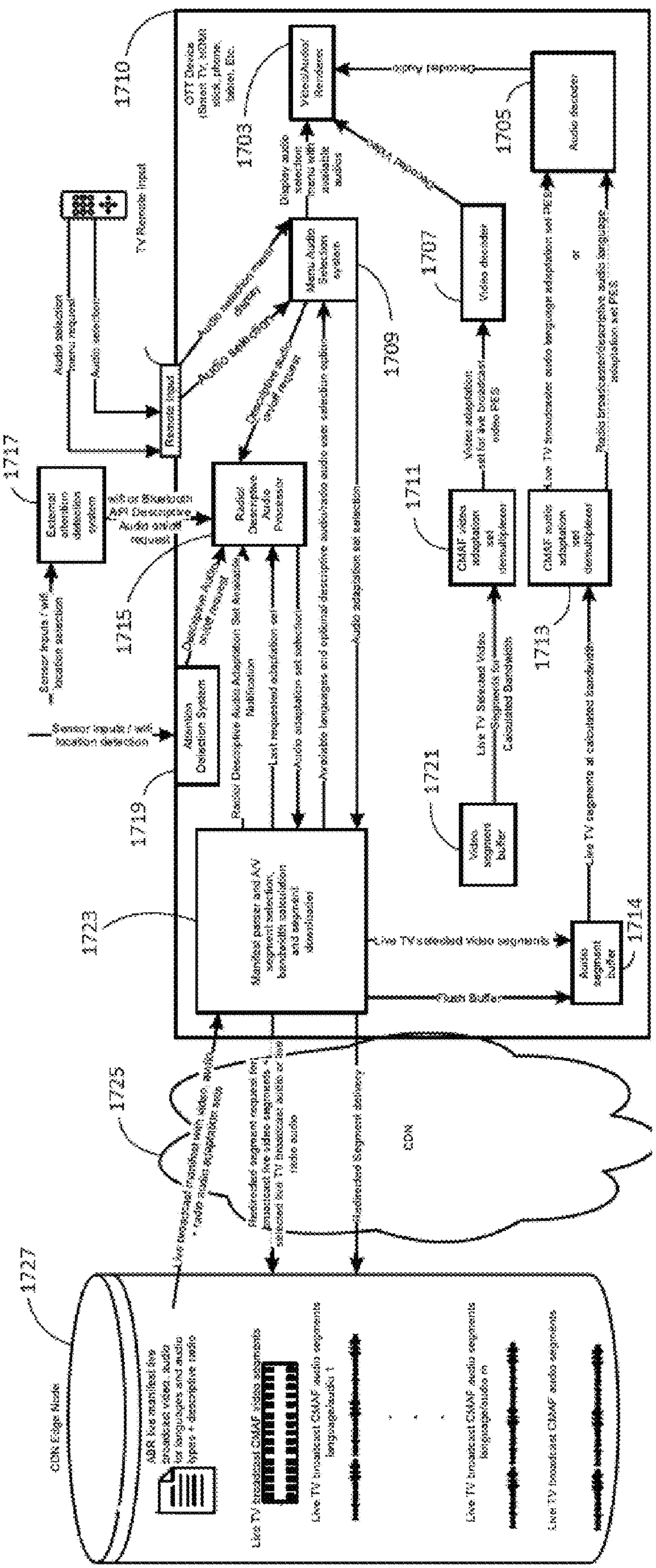
FIG. 17 depicts an architecture of an OTT client device system, in accordance with some embodiments of the disclosure.

FIG. 17 depicts an architecture of an OTT client device system, in accordance with some embodiments of the disclosure. In this architecture, the attention detection system may be defined the same as in the previous FIG. 16. One of the differences in the architecture of FIG. 17 from FIG. 16 may be how the Radio/descriptive audio availability and notifications between audios is accomplished.

In some embodiments, the OTT client device system 1710 includes a manifest parser and A/V Segment Selection, bandwidth calculation and Segment Downloader 1723, which communicates with the CDN edge node 1727 via a CDN network 1725. It also interfaces with audio segment buffer 1714, radio descriptive audio processor 1715 and menu audio selection system 1715.

The OTT client device system 1710 also includes a video segment buffer 1721 that interfaces with CMAF video adaptation set demultiplexer 1711, which in turn interfaces with video decoder 1707, which in turn interfaces with the video/audio renderer 1703.

The OTT client device system 1710 also includes a CMAF audio adaptation set demultiplexer 1713 which takes input from the audio segment buffer 1714 and it provides an output to the audio decoder 1705 which further provides an output to the video/audio renderer 1703.

In some embodiments, the OTT client device system 1710 interfaces with an external attention detection system 1717, which provides input to its radio descriptive audio processor 1715. The OTT client device system 1710 may include its own attention detection system 1719 that also provides input to the radio descriptive audio processor 1715.

In operation, the components of the OTT client device system 1710, and the external networks and components to which it is connected is used to select between the radio and TV broadcast and switch from one to another based on a triggering condition. In some embodiments, when a live broadcast service is requested, the manifest parser and A/V segment selection, bandwidth calculation and segment downloader 1723 requests a manifest for the live service. In response to the request, it may receive and parse the manifest. When the manifest is parsed, the manifest parser and A/V segment selection, bandwidth calculation and segment downloader 1723 may send the menu audio selection system 1709 all available languages and audio types along with the descriptive audio of the radio broadcast if it exists in the manifest. As discussed in the manifest example, there may be two proposed examples this could be identified in the ABR manifest. The manifest parser and A/V segment selection, bandwidth calculation and segment downloader 1723 may also sends the radio descriptive audio processor 1715 a notification that there is a radio/descriptive audio available along with an adaptation set identifier, represented in an ABR manifest file as demonstrated in FIGS. 18A-C. The menu audio selection system 1709 may display a notification that a radio descriptive alternate audio exists for the user or the client device to select. This may also be selected from a menu of available audio languages and type. If the user or device selects the alternate descriptive language, that language will be played when the broadcast is played. If not, the attention detection system 1719 may determine if the trigger condition, such as the user being distracted and not watching the TV broadcast or the user leaving the room, is satisfied. If the trigger condition is satisfied, the attention detection system 1719 may request to the radio descriptive audio processor 1715 to switch to the radio/descriptive audio.

The radio descriptive audio processor 1715 will make a request to the manifest parser and A/V segment selection, bandwidth calculation and segment downloader 1723 to request the audio adaptation set that is the radio descriptive audio. The manifest parser and A/V segment selection, bandwidth calculation and segment downloader 1723 may flush the audio segment buffer to allow instant playout of the switched audio PES stream as soon as enough of the audio packets have arrived to catch up with the matching video PTS. This may be optional since the segment sizes are relatively small, e.g., 2-3 seconds long, for live broadcast. If there is a buffer flush, the matching radio/descriptive audio segments may be requested again to replenish the audio buffer to match the video buffer. If there is no buffer flush, the next audio segment to download may be the next one needed to keep the buffer matching the video adaptation set.

In some embodiments, when the user is in the room and watching the TV broadcast, the attention detection system 1719 may notify the radio descriptive audio processor 1715 to disable the descriptive audio. If the user was previously listening to the Live TV broadcast for an audio language/type, the radio descriptive audio processor 1715 may send the last TV live broadcast audio to the manifest parser and A/V segment selection, bandwidth calculation and segment downloader 1723. The manifest parser and A/V segment selection, bandwidth calculation and segment downloader 1723 may then request the audio adaptation set for the selected language/type from the CDN edge and a buffer flush may or may not happen based on choice of implementation.

FIGS. 18A-C is an example of an adaptation set, in accordance with some embodiments of the disclosure. The figure is DASH MPD displayed in these separate portions that together form one DASH MPD. The DASH MPD depicted in FIGS. 18A-C is for a certain period of time in a DASH MPD that includes the new adaptation set for the audio stream of the radio broadcast.

In some embodiments, this representation of the adaptation set may allow the ABR player on the client device to recognize that there is an adaptation set only for audio associated with the radio broadcast. The highlighted and boxed words and phrases 1810-1830 are areas of the DASH MPD that could be modified to identify audio commentary or detailed audio in the audio adaptation sets. This embodiment also shows including radio in the filename.

In one scenario, the method may involve creating a specific Boolean field, such as audio commentary, to identify the areas that are audio only. This may allow the live ABR client device to have the knowledge that a descriptive audio is included for processing when the trigger condition is met, such as the user not being present in the room or is not paying attention to TV broadcast. This field may also allow the user or the device to select the detailed audio to play instead of the audio associated with the TV broadcast. This field may have other uses besides radio audio where any secondary descriptive audio track is included in the ABR content. For example, it may also be used to indicate other audio types and when to play them.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

accessing a radio broadcast and a television (TV) broadcast of a live event;

synchronizing the radio broadcast with the TV broadcast by synchronizing a portion of an audio stream associated with the radio broadcast with a portion of an audio stream associated with the TV broadcast, wherein, synchronizing the portion of the audio stream associated with the radio broadcast with the portion of the audio stream of the TV broadcast comprises, embedding a time stamp on a first audio packet of the radio broadcast and a first audio packet of the TV broadcast, wherein the time stamp has a common time and is generated using a network time protocol (NTP);

multiplexing the synchronized portion of the audio stream associated with the radio broadcast and the portion of the audio and video streams associated with the TV broadcast as a single multiplexed stream; and transmitting the single multiplexed stream to a client device either in response to detecting a triggering event or upon user request.

2. The method of claim 1, wherein the live event is a sports game and synchronizing the portion of the audio stream associated with the radio broadcast with the portion of the audio stream associated with the TV broadcast comprises synchronizing the portion of the audio from the audio stream corresponding to a play-by-play of the sports game to the same play-by-play as displayed via the TV broadcast such that the portion of the audio contextually matches the portion of the display.

3. The method of claim 1, wherein, synchronizing the portion of the audio stream associated with the radio broadcast with the portion of the audio stream associated with the TV broadcast, both of whose transmitters are located within a local transmission range of each other, further comprises:

causing local transmission of the portion of the audio stream associated with the radio broadcast to the TV broadcaster's headend;

causing audio encoders associated with the TV broadcaster's headend to encode the local transmission of the received portion of the audio stream associated with the radio broadcast;

causing multiplexing of the encoded local transmission of the portion of the audio stream with the portion of the audio and video stream of the TV broadcast to generate the single multiplexed stream; and causing transmission of the single multiplexed stream to the client device.

4. The method of claim 1, further comprising:

receiving the first audio packet of the radio broadcast with the embedded common clock time stamp;

buffering the first audio packet of a radio audio frame associated with the radio broadcast until the first audio packet of the TV broadcast with a same time stamp is received; and upon receiving the first audio packet of the TV broadcast with the same time stamp as the first audio packet of the radio broadcast, multiplexing the two packets together by aligning their time stamped positions to generate the single multiplexed stream.

5. The method of claim 1, wherein the synchronizing of the clock associated with the radio broadcast with the clock associated with the TV broadcast is performed by either a) an NTP server associated with the radio broadcast and the TV broadcast or b) over internet using a remote NTP server.

6. The method of claim 1, wherein, the radio broadcaster's transmitter is located at a first location and the TV broadcaster's transmitter is located at a second location, wherein the first location is either outside a local transmission range of the second location or not connected to the second location via a wire.

7. The method of claim 1, wherein, the triggering event is detected when a determination is made that a consumer of the TV broadcast is not consuming the TV broadcast, wherein the determination that the consumer of the TV broadcast is not consuming the TV broadcast is based on a) detecting that the user's gaze is away from a display device playing the TV broadcast, b) detecting that the user has walked away from a room where the TV broadcast is displayed on the display device, or c) detecting that the user is engaged in another activity simultaneously while consuming the TV broadcast on the display device.

8. The method of claim 1, further comprising:

lowering a bitrate of the TV broadcast in response to detecting the triggering event; and transmitting either the single multiplexed stream or an audio only stream associated with the radio broadcast with the lowered bitrate to the client device.

9. The method of claim 1, further comprising:

determining whether to reduce a bitrate of the TV broadcast, wherein the determination whether to reduce the bitrate further comprises:

determining whether there are other people in a same room as user who are consuming the TV broadcast on a display; and in response to detecting that the user has left the room where the TV broadcast is displayed:

not reducing the bitrate of the TV broadcast in response to determining that there are other people in the room where the TV broadcast is displayed; and reducing the bitrate of the TV broadcast in response to determining that there are no other people in the room where the TV broadcast is displayed.

10. The method of claim 1, wherein synchronizing the radio broadcast with the TV broadcast further comprises:

physically connecting a microphone associated with the radio broadcast to a dedicated encoder associated with the TV broadcast via a physical wire;

causing transmission of the portion of the audio stream associated with the radio broadcast to the dedicated encoder associated with the TV broadcast via the physical wire; and causing multiplexing of the received audio stream associated with the radio broadcast with the audio and video streams associated with the TV broadcast as a single multiplexed stream.

11. The method of claim 1, wherein synchronizing the radio broadcast with the TV broadcast further comprises:

receiving a first packet for a radio audio frame associated with the radio broadcast having MPEG7 or KLV metadata, wherein the first packet for the radio audio frame includes a time stamp using a common clock;

receiving a first packet for a TV audio frame associated with the TV broadcast, wherein the first packet for the TV audio frame includes a time stamp using a common clock; and multiplexing and synchronizing the first packet for the radio audio frame associated with the radio broadcast with the first packet for the TV audio frame associated with the TV broadcast based on the common clock time stamps.

12. A system comprising:

communications circuitry configured to access a radio broadcast and a television (TV) broadcast of a live event; and control circuitry configured to:

synchronize the radio broadcast with the TV broadcast by synchronizing a portion of an audio stream associated with the radio broadcast with a portion of an audio stream associated with the TV broadcast, wherein, synchronizing the portion of the audio stream associated with the radio broadcast with the portion of the audio stream of the TV broadcast comprises, embedding a time stamp on a first audio packet of the radio broadcast and a first audio packet of the TV broadcast, wherein the time stamp has a common time and is generated using a network time protocol (NTP);

multiplex the synchronized portion of the audio stream associated with the radio broadcast and the portion of the audio and video streams associated with the TV broadcast as a single multiplexed stream; and transmit the single multiplexed stream to a client device either in response to detecting a triggering event or upon user request.

13. The system of claim 12, wherein the live event is a sports game and synchronizing the portion of the audio stream associated with the radio broadcast with the portion of the audio stream associated with the TV broadcast comprises, the control circuitry configured to synchronize the portion of the audio from the audio stream corresponding to a play-by-play of the sports game to the same play-by-play as displayed via the TV broadcast such that the portion of the audio contextually matches the portion of the display.

14. The system of claim 12, wherein, synchronizing the portion of the audio stream associated with the radio broadcast with the portion of the audio stream associated with the TV broadcast, both of whose transmitters are located within a local transmission range of each other, further comprises, the control circuitry configured to:

cause local transmission of the portion of the audio stream associated with the radio broadcast to the TV broadcaster's headend;

cause audio encoders associated with the TV broadcaster's headend to encode the local transmission of the received portion of the audio stream associated with the radio broadcast;

cause multiplexing of the encoded local transmission of the portion of the audio stream with the portion of the audio and video stream of the TV broadcast to generate the single multiplexed stream; and cause transmission of the single multiplexed stream to the client device.

15. The system of claim 12, further comprising, the control circuitry configured to:

receive the first audio packet of the radio broadcast with the embedded common clock time stamp;

buffer the first audio packet of a radio audio frame associated with the radio broadcast until the first audio packet of the TV broadcast with a same time stamp is received; and upon receiving the first audio packet of the TV broadcast with the same time stamp as the first audio packet of the radio broadcast, multiplex the two packets together by aligning their time stamped positions to generate the single multiplexed stream.

16. The system of claim 12, wherein, the triggering event is detected by the control circuitry when a determination is made that a consumer of the TV broadcast is not consuming the TV broadcast, wherein the determination that the consumer of the TV broadcast is not consuming the TV broadcast is based on a) detecting that the user's gaze is away from a display device playing the TV broadcast, b) detecting that the user has walked away from a room where the TV broadcast is displayed on the display device, or c) detecting that the user is engaged in another activity simultaneously while consuming the TV broadcast on the display device.

17. The system of claim 12, further comprising, the control circuitry configured to:

lower a bitrate of the TV broadcast in response to detecting the triggering event; and transmit either the single multiplexed stream or an audio only stream associated with the radio broadcast with the lowered bitrate to the client device.

18. The system of claim 12, further comprising, the control circuitry configured to:

determine whether to reduce a bitrate of the TV broadcast, wherein the determination whether to reduce the bitrate further comprises:

determining whether there are other people in a same room as user who are consuming the TV broadcast on a display; and in response to detecting that the user has left the room where the TV broadcast is displayed:

not reducing the bitrate of the TV broadcast in response to determining that there are other people in the room where the TV broadcast is displayed; and reducing the bitrate of the TV broadcast in response to determining that there are no other people in the room where the TV broadcast is displayed.

19. The system of claim 12, wherein synchronizing the radio broadcast with the TV broadcast further comprises, the control circuitry configured to:

physically connect a microphone associated with the radio broadcast to a dedicated encoder associated with the TV broadcast via a physical wire;

cause transmission of the portion of the audio stream associated with the radio broadcast to the dedicated encoder associated with the TV broadcast via the physical wire; and cause multiplexing of the received audio stream associated with the radio broadcast with the audio and video streams associated with the TV broadcast as a single multiplexed stream.

20. The system of claim 12, wherein synchronizing the radio broadcast with the TV broadcast further comprises, the control circuitry configured to:

receive a first packet for a radio audio frame associated with the radio broadcast having MPEG7 or KLV metadata, wherein the first packet for the radio audio frame includes a time stamp using a common clock;

receive a first packet for a TV audio frame associated with the TV broadcast, wherein the first packet for the TV audio frame includes a time stamp using a common clock; and multiplex and synchronize the first packet for the radio audio frame associated with the radio broadcast with the first packet for the TV audio frame associated with the TV broadcast based on the common clock time stamps.

* * * * *